(12) United States Patent
White

(10) Patent No.: US 10,943,298 B1
(45) Date of Patent: Mar. 9, 2021

(54) FINANCIAL PLANNING AND MANAGEMENT SYSTEM AND METHOD

(71) Applicant: Thomas F. White, Franklin, TN (US)

(72) Inventor: Thomas F. White, Franklin, TN (US)

( * ) Notice: Subject to any disclaimer, the term of this patent is extended or adjusted under 35 U.S.C. 154(b) by 20 days.

(21) Appl. No.: 13/838,635

(22) Filed: Mar. 15, 2013

Related U.S. Application Data

(60) Provisional application No. 61/613,002, filed on Mar. 20, 2012.

(51) Int. Cl.
*G06Q 40/06* (2012.01)

(52) U.S. Cl.
CPC .................. *G06Q 40/06* (2013.01)

(58) Field of Classification Search
USPC .................. 705/35, 36 R, 37, 42
See application file for complete search history.

(56) References Cited

U.S. PATENT DOCUMENTS

| | | | | |
|---|---|---|---|---|
| 6,064,984 A | * | 5/2000 | Ferguson | G06Q 40/00 705/35 |
| 2004/0054610 A1 | * | 3/2004 | Amstutz | G06Q 40/06 705/36 R |
| 2006/0074788 A1 | * | 4/2006 | Grizack | G06Q 40/00 705/35 |

OTHER PUBLICATIONS

Intuit Inc., "Quicken Deluxe 5: Deluxe User's Guide", Sep. 1995, Intuit Inc.*
Deluxe User's Guide, Quicken Deluxe: Verison 5 for Windows, Intuit Inc, Sep. 1995.*
Intuit, "Quicken Deluxe 5: Deluxe User's Guide," 1995 (Year: 1995).*

* cited by examiner

*Primary Examiner* — David P Sharvin
(74) *Attorney, Agent, or Firm* — Wayne Edward Ramage; Baker Donelson

(57) ABSTRACT

A system and method for assisting users in selecting and prioritizing financial or business goals, and determining a cash flow designed to meet those goals. The user provides, or authorizes the provision of, financial information, which is used by the system to calculate an initial cash flow. The system actively assists the user in selecting and planning for a variety of financial goals, automatically calculates and determines the financial requirements to achieve each of the goals, structures financial products or plans for each goal, and determines whether the user has sufficient assets and/or cash flow to fund or achieve the goals. Goals are prioritized according to a set of business rules, and cash flow elements and goals can be modified or changed according to a variety of business rules in order to fund or achieve the goals.

8 Claims, 47 Drawing Sheets

| Dashboard | Cash Flow | Goals | Security | Nav Item | Nav Item |

You've got a beautiful family!

To help us create just the right goals for you, could you answer a few questions for us?

Do you have one month's worth of expenses saved? [Yes]

Do you have any debt? [Yes]
This includes any credit card debt, any house or car payments, or other debts.

What kind of insurance do you have?
- ☑ Life Insurance
- ☑ Disability Insurance
- ☑ Long Term Care Insurance

Why is this important?

One Month's Expenses:
This is the minimum amount you would need in case of an emergency. Life can bring unexpected things your way, so we want you to have some security in knowing that you've got some protection.

Credit Card Debt:
Eliminating debt is an important part of your finances. Credit cards affect your credit score and your monthly cash flow. This is critical in helping to prioritize what steps you need to take to improve your finances.

Insurance:
It is necessary to protect those dependent on you. Having that security is essential and is one of the key planning principles that iQuantifi is based on.

[ OK, show me some goals ]

FIGURE 7

| Summary | My Goals | My Cash Flow | My Net Worth |
|---|---|---|---|
| | | | Back to My Goals |

Here's what we're thinking...
50

Based on what you told us, here are some goals we can work on:

 Establish an Emergency Fund   Remove

 Payoff or Restructure my Debts   Remove

 Plan for my Children's College Education   Remove

 Plan for Purchasing a Care   Remove

 Plan for Purchasing a House   Remove

Plan for Retirement   Remove

Plus, you'll need some financial protection:

 Create a Contingency Plan in Event of Disability   Remove

Other goals you can accomplish:
52

Foundation Goals
Protect my estate from Long Term Care costs
Add this goal to your list

FIGURE 8

| Dashboard | Cash Flow | Goals | Security | Nav Item | Nav Item | SEARCH..... |

Back to My Goals

Welcome in!   60

To finish getting you set up, we just need to do a few things. You can do all of these things now, or come to finish them at any time

62

✓ Connect to your bank accounts

To give you the most accurate advice possible, we need to understand your cash flow. To save time, you can link your accounts directly to iQuantifi to create your budget

2. Tell us about the house you want to buy

Let's take a closer look at the amount you're aiming for and the timeframe you have to buy a house. It is recommended that you put 20% towards a downpayment in order to avoid additional costs.

3. Let us know about college

For a more concise picture of your plans, let's gather some information about what types of college you are thinking about

4. Give us your view on retirement

We need some important information from you to help plan for a comfortable retirement. We will include various factors such as age, social security, and other items that influence your retirement goals. We want to be sure that you have the income you need to take care of your future needs.

| Quantifi  64 |

Your goals so far:

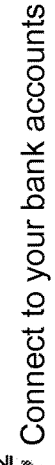 Save One Month's Cash Reserves

 Buy A House

 Save for College

Also, protection you'll need:

 Life Insurance

 Disability Insurance

FIGURE 9

| Dashboard | Cash Flow | Goals | Security |

Tell us about your insurance policies

82

Your life insurance policies:

Justin's policy is worth $ 84
and costs us $ 86

Justin doesn't have a policy

Mollie's policy is worth $
and costs us $

88
Mollie doesn't have a policy

Your disability insurance policies:

Justin's policy is worth $
and costs us $

Justin doesn't have a policy

Mollie's policy is worth $
and costs us $

Mollie doesn't have a policy

Your long-term care insurance policies:

Justin's policy is worth $
and costs us $

Justin doesn't have a policy

FIGURE 15

| Dashboard | Cash Flow | Goals | Security |

You'll Need to Prep for College

Since you've got young'uns, you'll need to think about their college needs. Saving for that is an important part of a financial plan, so give us a little info about where you think the smart little tykes will go to school:

Johnny will go to school [In State]
and will (hopefully) go for [4 Years (Bachelor's)] _Remove Johnny from this goal_
We're planning on saving [100%] of the total cost of Johnny's college tuition.

Haley will go to school [In State]
and will (hopefully) go for [4 Years (Bachelor's)] _Remove Haley from this goal_
We're planning on saving [100%] of the total cost of Haley's college tuition.

[ FINISHED ]

FIGURE 16

| Dashboard | Cash Flow | Goals | Security |

Set up Retirement

You want to retire, right? Who wants to work until their fingers are gnawed down to the bone?

The following few pages will help you get your retirement set up and squared away. We know, this is taking awhile—trust us, this is the last part, and really important to giving you great advice.

We promise, it won't take longer than 15-20 minutes or so. Okay?

Things You'll Need

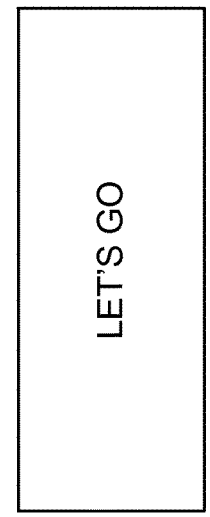

- Required Asset
- Required Asset
- Required Asset
- Required Asset
- Required Asset
- Required Asset

[ LET'S GO ]

FIGURE 17

| Dashboard | Cash Flow | Goals | Security |

Add Goal: Retirement

First, which of the following apply to you?

We have investment accounts
Investment accounts are accounts like 401Ks, IRAs, 403Bs, etc. These are special retirement investment vehicles.

We have installment accounts
Installment accounts are debts you pay regularly, like mortgages, car payments, etc.

One or both of us have a pension
Pensions are magical animals, with 4 horns and sparkly fur.

We own rental property
Houses, apartments, malls, and garages. Whatever you like.

[ NEXT STEP ]

FIGURE 18

| Dashboard | Cash Flow | Goals | Security |

Last step: Set up Retirement

Tell us about your Social Security benefits

Don't laugh. You never know. Tell me more

Not sure what your benefit will be? You can find out in one of two places:

- Your quarterly Social Security statement mailed to you by the government.
- Visit the Social Security Administration online and immediately find your benefit.

Regardless of where you find your benefit, you'll want to use the amount for age 62. Learn why.

Benefit amount at retirement: $ xxxx /month
Name

Benefit amount at retirement: $ xxxx /month
Name

NEXT STEP

FIGURE 20

Social Security

| HOME | *my* Social Security | Retirement | Disability | Survivors | SSI | Medicare | Business Services |

Retirement Estimator

How the Retirement Estimator Works

The Retirement Estimator gives estimates based on your actual Social Security earnings record. Please keep in mind that these are just estimates. We can't provide your actual benefit amount until you apply for benefits. And that amount may differ from the estimates provided because:

- Your earnings may increase or decrease in the future.
- After you start receiving benefits, they will be adjusted for cost-of-living increases.
- Your estimated benefits are based on current law. The law governing benefit amounts may change because, by 2033, the payroll taxes collected will be enough to pay only about 75 cents for each dollar of scheduled benefits.
- Your benefit amount may be affected by military service, railroad employment or pensions earned through work on which you did not pay Social Security tax.

Who Can Use the Retirement Estimator

You can use the Retirement Estimator if:

Related Information

Estimate Your Life Expectancy

What is the best age to start receiving retirement benefits?

Other Things to Consider

Note:
If you need information about how to move around in the Retirement Estimator, please read, "How to Move Around in This Application."

FIGURE 21

Almost finished

Take a look at what you've told us about your retirement plans and make sure things look good. If they do, simply hit Finished and you're done!

What other financial goals do you have?

Who's Retiring?

☐ Justin
Birthday: 08/20/1980
Retiring at age 62

☐ Mollie
Birthday: 08/20/1980
Retiring at age 62

Social Security Payments

☐ Justin
Will receive $XXXX/month, starting at age 62

☐ Mollie
Will receive $XXXX/month, starting at age 62

Pensions

☐ Justin's Pension
Will receive $XXXX/month, starting at age 62

Rental Property

☐ House in Florida
Currently receiving $XXXX/month in rental payments

| Looks good. I'm finished. |

FIGURE 26

Tell us about your debts

Dashboard | Cash Flow | Goals | Security

Add your debt

[ ] Credit Card      [ ] Car      [ ] Mortgage      [ ] Other

[ Finished! ]

FIGURE 27

| Dashboard | Cash Flow | Goals | Security |

You're just about done...

You've successfully set up your retirement goal—excellent work! We know that was a lot of work, thanks for sticking in there.
Below is a summary of what you've told us. Check to make sure things look right before hitting "Finish." If you ever need to change anything, you can simply go back to this goal and edit whichever parts you need.

Debts Summary

Credit Cards: edit

VISA
Currently paying $XXXX/month, with $XXXX left on the loan.

Car Debt: edit

Car Payment - Audi
Paying $XXXXX/month, with $XXXXX left on the loan.

Mortgage: edit

Our House
Paying $XXXXX/month, with $XXXXX left on the loan.

| Looks good. I'm finished. |

FIGURE 28

Add Goal: Buy a House

| Dashboard | Cash Flow | Goals | Security |
|---|---|---|---|

Purchasing a home is a big financial step. Whether you already own a home or are looking to buy your first home, there are a lot of factors involved in the decision. The questions we ask will help us determined the amount of house you can purchase, as well as the time needed to do so. It will also help to prioritize this goal among the other goals on your list.

Total time to complete this goal setup: 10-15 minutes

Get Started

FIGURE 29

| Dashboard | Cash Flow | Goals | Security |

Next Steps (steps remain)

Buy a House

One more thing. How do you plan to pay for your new home?

Your Down Payment:

How much will your down payment be? $

Have you already saved money for your down payment?

You're just about done...

You've successfully set up your house goal—excellent work! Below is a summary of what you've told us. Check to make sure things look right before hitting "Finish." If you ever need to change anything, you can simply go back to this goal and edit where needed.

Buy a House Goal Summary

The House You Want: edit

Target Purchase Date: 3/15/2014
   You're looking to spend $XXX,XXX
   It'll be located in: Tampa, FL (33626)
   It will be your primary residence

The House You Have: edit

You do currently own a home.
   You are planning on selling it.
   You'll think you'll get $XXX,XXX for it.

How You'll Pay For It: edit

You plan on putting $XXX,XXX down
   You've saved $XX,XXX for it so far (account <account name>)

[ Looks good. I'm finished. ]

FIGURE 33

Steps to Create This Goal

[ ] Finished Step Name

[ ] Finished Step Name

[ ] Finished Step Name

[ ] Current Step

[ ] Step Name 5 (# min)

Buy A Car

Lastly, tell us about any money you've saved for your car

Have you saved any money for purchasing this car?  Yes

Where is this money saved?

Bank of America Savings #1234
Balance: $12,345
Amount not already being saved for something else: $2,345  See Breakdown How much of this account is set aside for your new car?  $

Regions Savings #5678
Balance: $12,345
Amount not already being saved for something else: $2,345  See Breakdown +Add Another Savings Account Next Step

FIGURE 36

You're just about done...

You've successfully set up a goal to buy a car.
Check to make sure things look right, then simply hit "Finish" to see your updated goal and action lists.

Buy a Car Goal Summary

The Car You Want:  edit

Target Purchase Date: January 2012
    You're looking to spend $XX,XXX
    You're planning on paying $XXXX in cash for the care.

The Car You Have:  edit

You do currently own a car.
    You are planning on selling it.
    You'll think you'll get $XX,XXX for it.

Your Current Car Savings:  edit

You've currently saved $XXXX for this car purchase.

[ Looks good. I'm finished. ]

FIGURE 37

| HOME | ACTION LIST | GOALS | MY NETWORK | MY CASHFLOW | EXPENSE PLANNER | COMMUNITY |

130

ACTION LIST

1. Apply for $500,000 30-year term life insurance on Jim's life  ✓ Accepted  ✓ Completed 2. Apply for $400,000 30-year term life insurance on Lisa's life
   *Alternative Recommendation: Pending Review*  ☐ Accept  ☑ Do Not Accept 3. Pay-off Visa credit card  ✓ Accepted  ✓ Completed

132

4. Draft Wills, Medical Directive documents  ✓ Accepted  [Take Action]

5. Apply for $280,000 30-year fixed mortgage  ✓ Accepted  [Take Action]

6. Reallocate Jim's 401(k) balance and contribution allocations  ☐ Accept  ☐ Do Not Accept 7. Open a non-qualified brokerage account (short term bond fund) and reallocate to it $6250 from Bank of America savings account  ☐ Accept  ☐ Do Not Accept

Quan Points Central

TOTAL POINTS: 465

Add an ACCOUNT (10 pts)
Add a new GOAL (10 pts)
Redeem Quan Points
What are Quan Points?

Calendar

Jun 30  Action item
July 1  Action item
Aug 30  Action item
Sep 1  Action item

-import calendar to Outlook-

| SUMMARY | MY GOALS | MY CASHFLOW | MY NETWORTH | MY PROFILE |

My Financial IQ

*How it works*

TOTAL POINTS  465

+ Add an ACCOUNT
+ Add a new GOAL

Build your list of goals

Recommended:             Other Goals:

*Drag and drop*

- Automobile
- Large Purchase
- House
- Long Term Care
- College

- Cash Reserves
- Pay Off Debt
- Retirement

Short Term Goals
(0-24 months)

Medium Term Goals
(2-5 years)

Long Term Goals
(5+ years)

FINANCIAL PLANNING AND MANAGEMENT SYSTEM AND METHOD

This application claims benefit of and priority to U.S. Provisional Application No. 61/613,002, filed Mar. 20, 2012, by Thomas F. White, and is entitled to that filing date for priority. The specification, figures and complete disclosure of U.S. Provisional Application No. 61/613,002 are incorporated herein by specific reference for all purposes.

FIELD OF INVENTION

This invention relates to a system and method for financial planning and management. In particular, this invention relates to a system and method for establishing financial goals and analyzing cash flow.

BACKGROUND OF THE INVENTION

Many people have difficulty in understanding and managing their financial situation or status, and in establishing and planning for financial goals. A variety of financial programs or systems are available, but these generally do not assist the user in intelligently and comprehensively managing that individual's finances, or provide specific suggestions or recommendations. Financial planners or consultants can provide assistance in several areas, but usually at substantial cost. In addition, many planners or consultants have expertise or interests only in some areas, and thus cannot provide comprehensive advice.

SUMMARY OF INVENTION

In various embodiments, the present invention comprises a system and method for assisting users in selecting and prioritizing financial or business goals, and determining a cash flow designed to meet those goals.

In one embodiment, a user initially creates an account within the system. Upon logging in, the user selects a desired demographic category, then selects desired goals. The system can have different types of goals with different time frames in which to achieve the goal. Some time frames can be determined or set by the user. Examples of goals are discussed in more detail below, and may include, but are not limited to, premature death planning, disability planning, establishing cash reserves (1 month, 3 months, 6 months), buying or leasing a car, buying or leasing a house or other real estate, elimination of debt, saving or paying for college or other education, saving for retirement, and planning for long-term care.

The system then prompts the user to provide financial information (such as, but not limited to, income, expenses, checking account data, and credit card account data). The system then calculates the user's cash flow. In one exemplary embodiment, the user enters his or her income, and provides the checking account and credit card account data, from which the system determines expenses and the resulting cash flow.

The user then modifies or completes the input for the desired goals. The system, using a processor or microprocessor, automatically calculates and determines the financial requirements to achieve each of the goals, structures financial products or plans for each goal, and determines whether the user has sufficient assets and/or cash flow to fund or achieve the goals. If there are sufficient assets and/or cash flow, the system prioritizes the goals according to a set of business rules, and if it determines that the user has sufficient assets or cash flow to fund prioritized goals, then it creates a list of user "action items," ordered according to goal priorities. The user can accept the list, or modify or customize the list. Once accepted, the system creates and/or displays a offerings list for the first goal, and prompts the user to select an institution or product to implement the goal. Upon selection, the user is routed to the portal page for the institution or product, or in an alternative embodiment, the system handles the interaction with the institution or acquires the product. The user is then prompted to repeat the offering process for the other goals on the action item list.

If the user does not have sufficient assets and/or cash flow to fund or achieve the goals, the system prompts the user to find other sources of income (e.g., tax refunds), modify the cash flow, or modify the desired goals, until the goals are within the range of assets and cash flow.

In one exemplary embodiment, the business rules for the system encompass capital allocation business rules, cash flow allocation business rules and parameter "stretch" business rules.

In another exemplary embodiment, as part of the cash flow calculation, the system categorizes each expense item derived from the aggregation of the user's checking account and credit cards, and any other account used for their monthly expenses into several expense categories.

In one exemplary embodiment, if the user does not have sufficient available monthly cash flow to meet all their financial goals, the system will recommend reallocation of monies to increase the available monthly cash flow. These recommendations may follow a particular order.

For product structuring, the system identifies the specific financial product that the user needs to implement to achieve their financial goal. For example, if a user has a goal of buying a house, the system determines not only the mortgage amount but also the most suitable term for the mortgage, such as a 15-year or 30-year mortgage based on the user's specific financial situation taking into consideration all of their goals. In the case of life insurance for "protection" goals, the system determines not only the amount of life insurance, but also the type of insurance (term or permanent), and the duration of the policy (if term), such as a 10-year or 30-year term that is most suitable for that particular user.

In another embodiment, the system provides goal timelines. Users can adjust the timing of a financial goal by "sliding" it along a comprehensive timeline. The system recalculates all the financial goals of the user in real time after the user slides one financial goal along the timeline to illustrate for the user how it affects all their other goals. For example, if the user initially indicated that they wanted to buy a car in 18 months and a house in 3 years, this function enables the user to move the timeframe of the house to 12 months and see how it affects the car goal and all other goals that this move may affect in order for the user to make real time decisions regarding their whole financial situation.

BRIEF DESCRIPTION OF THE DRAWINGS

FIGS. 5-8 show a diagram of another system in accordance with another embodiment of the present invention.

FIG. 9 is a display of a screen of initial steps for a user to complete.

FIG. 15 is a display of an insurance policy information screen.

FIG. 16 is a display of a school plan screen.

FIGS. 17-26 show displays of screens for retirement planning.

FIG. 27 is a display of a debt information screen.

FIGS. 28-33 show displays of screens for buying a home.

FIGS. 34-37 show displays of screen for buying a car.

FIG. 40 shows an example of an Action List screen.

FIG. 42 shows an example of an expense planning screen.

FIG. 44 shows an example of a goals screen.

FIG. 45 shows another example of a goals screen.

DETAILED DESCRIPTION OF EXEMPLARY EMBODIMENTS

In various exemplary embodiments, the present invention provides a system and method for users to select and prioritize financial or business goals, and determine a cash flow designed to meet those goals.

Figure 1:
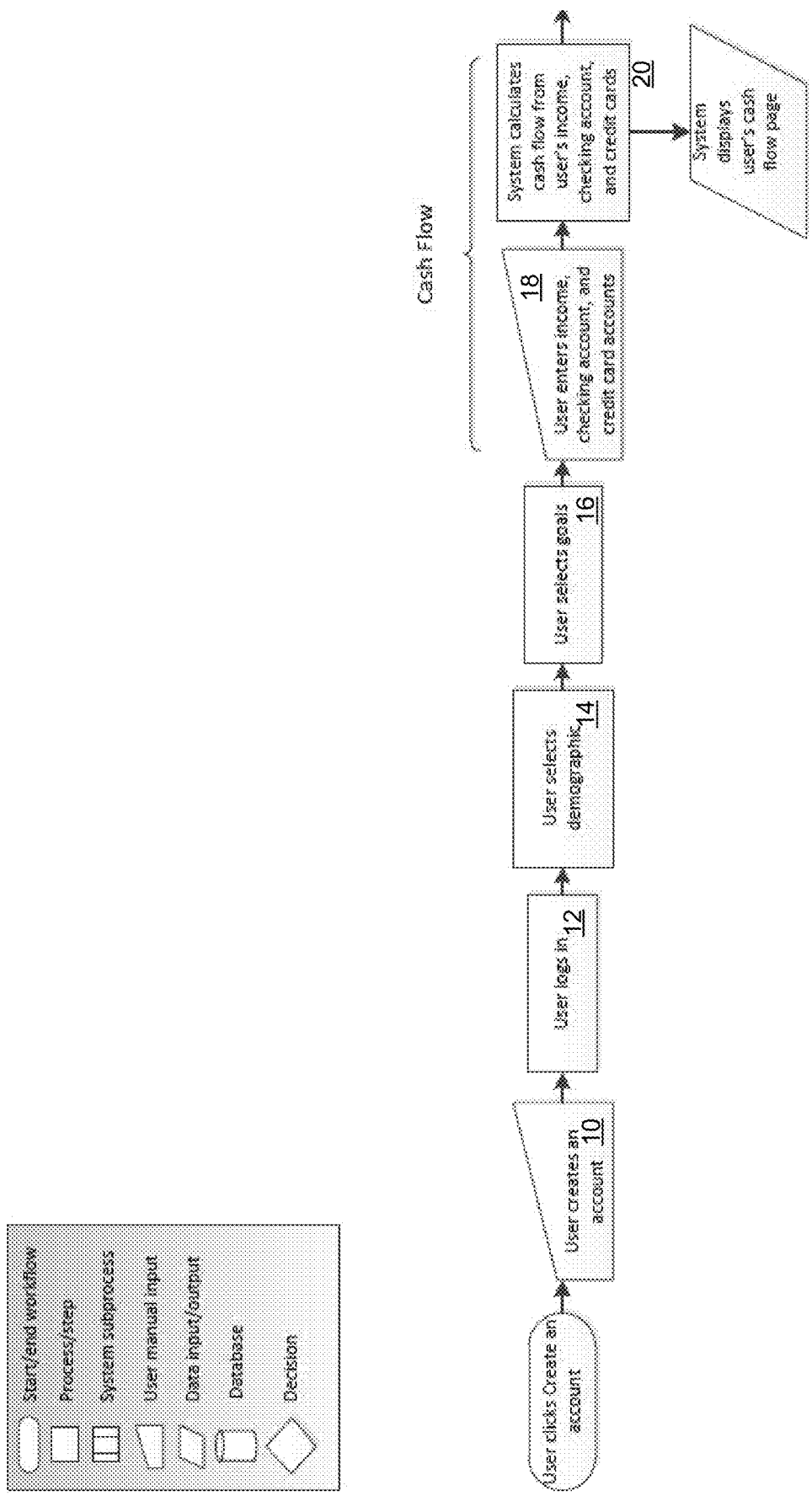
FIGS. 1-4 show a diagram of a system in accordance with an embodiment of the present invention.
Figure 2:
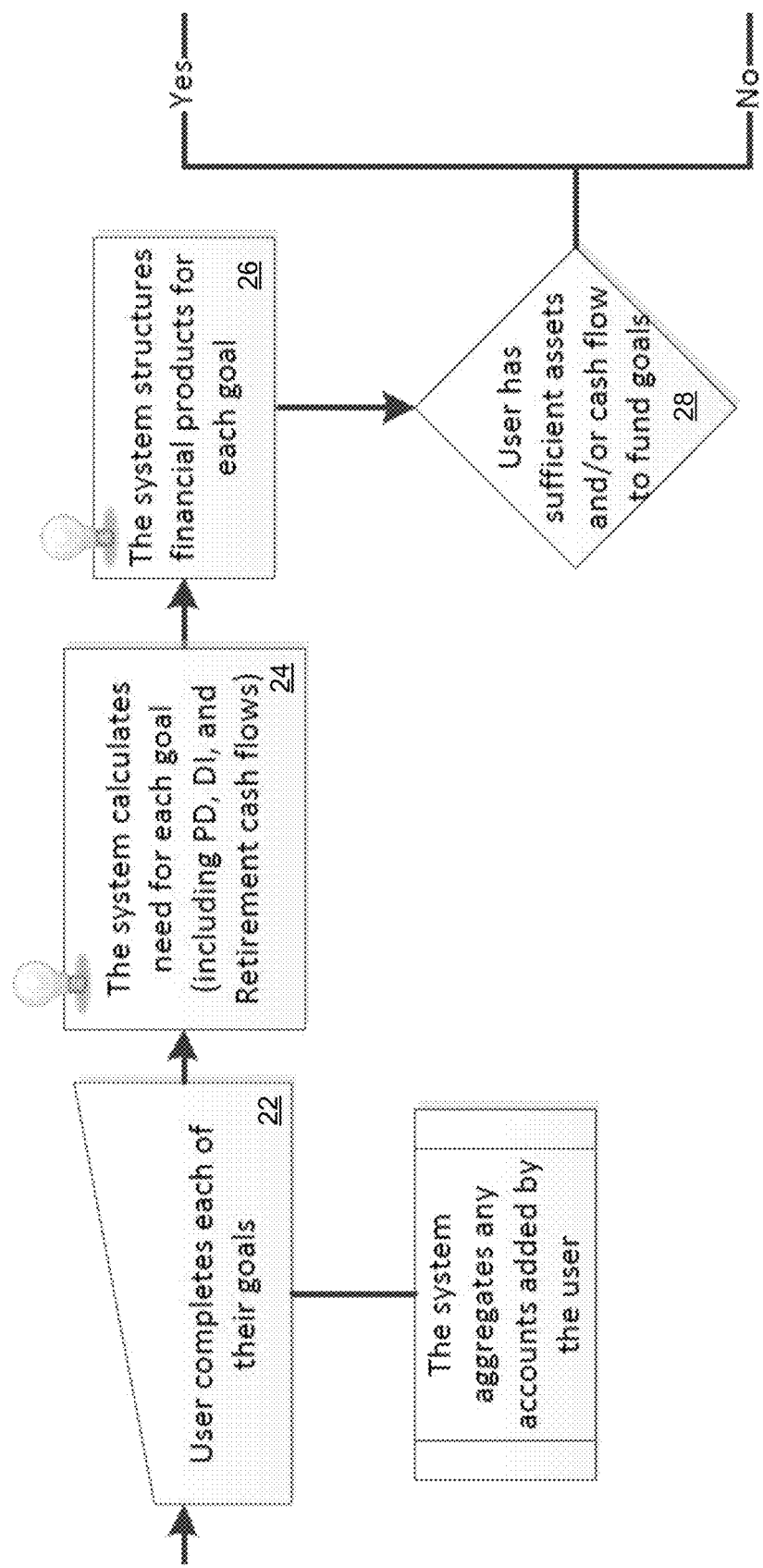
Figure 3:
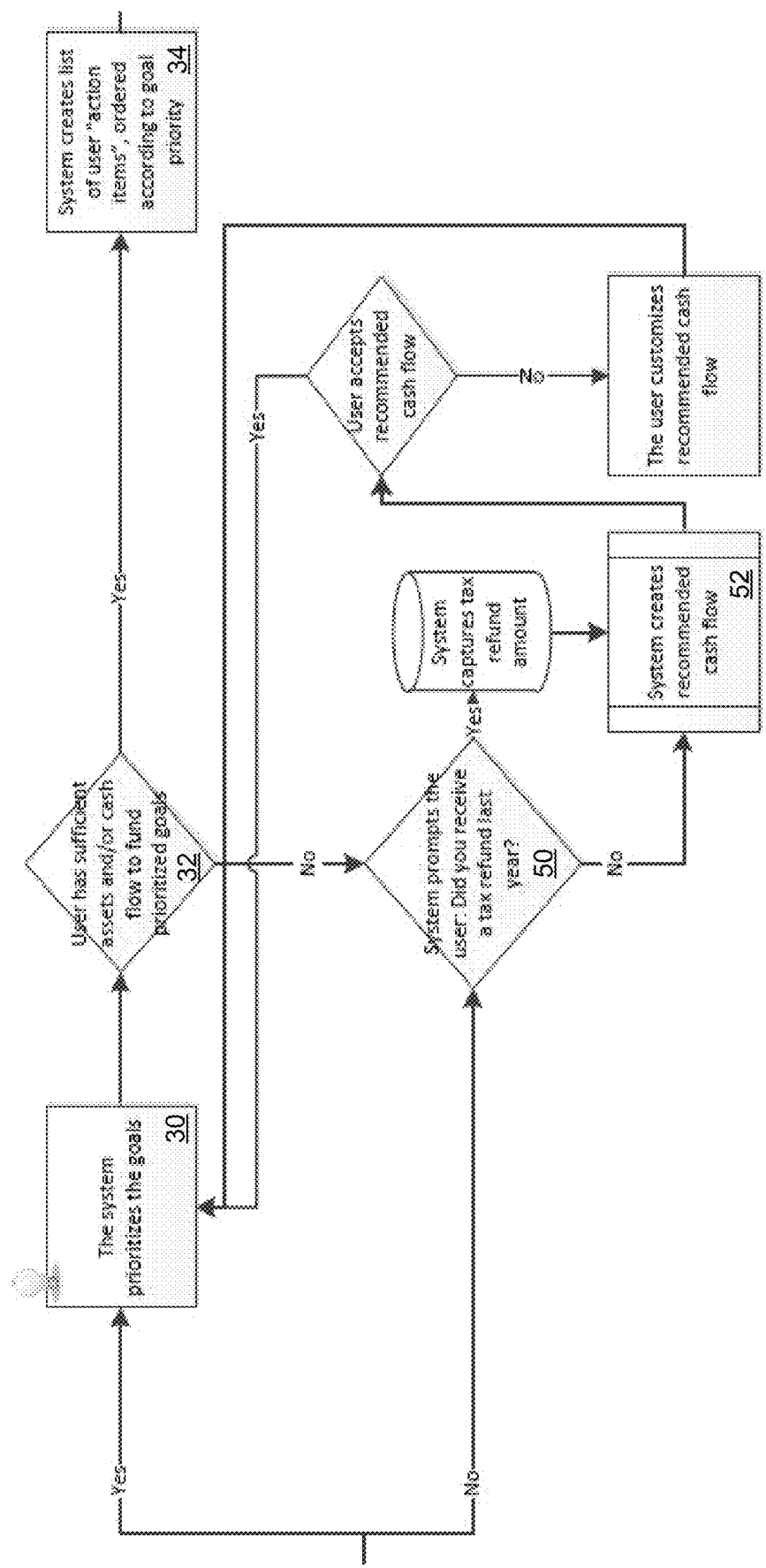
Figure 4:
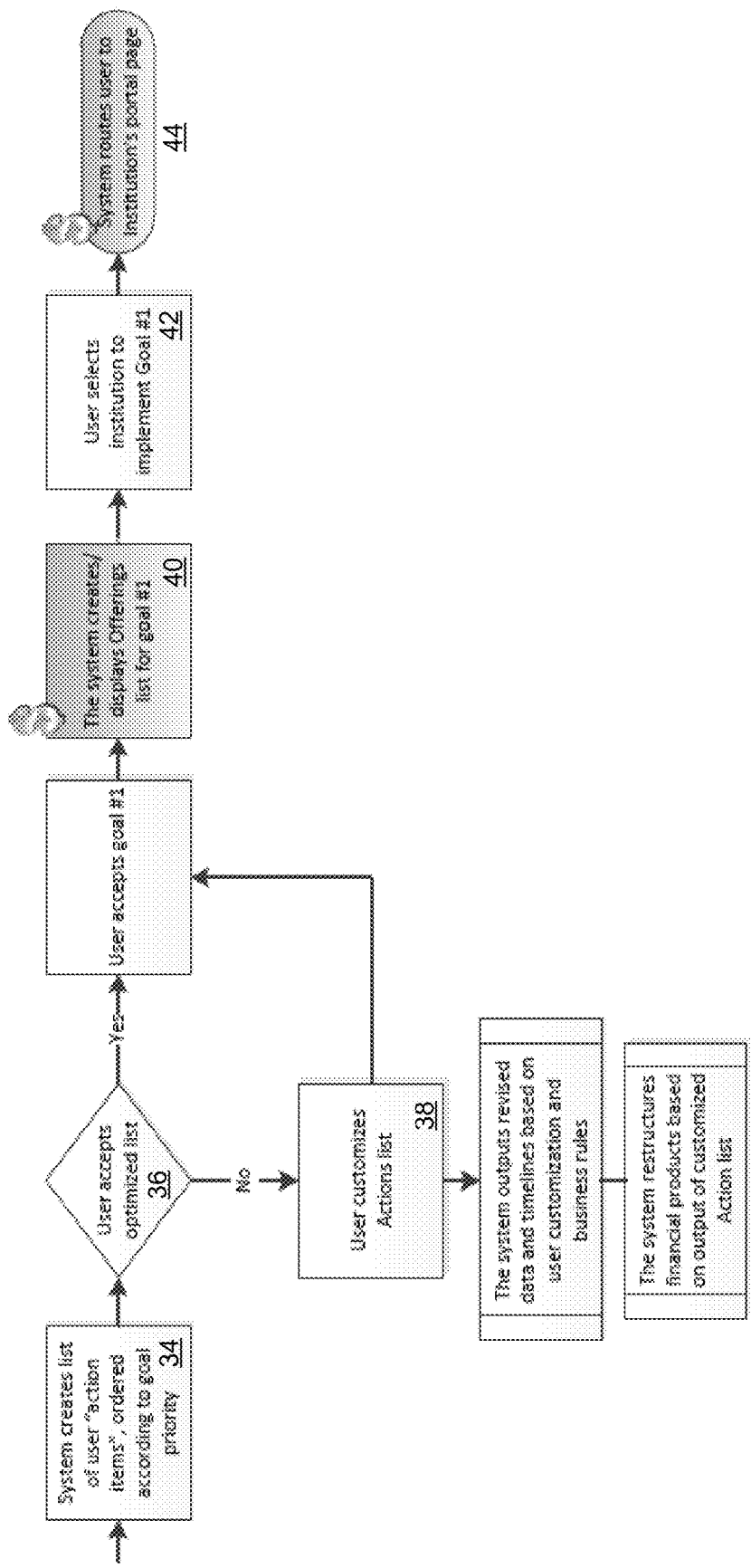
Figure 10:
FIGS. 10-14 show displays of screens for adding checking and savings accounts to the system.
Figure 11:
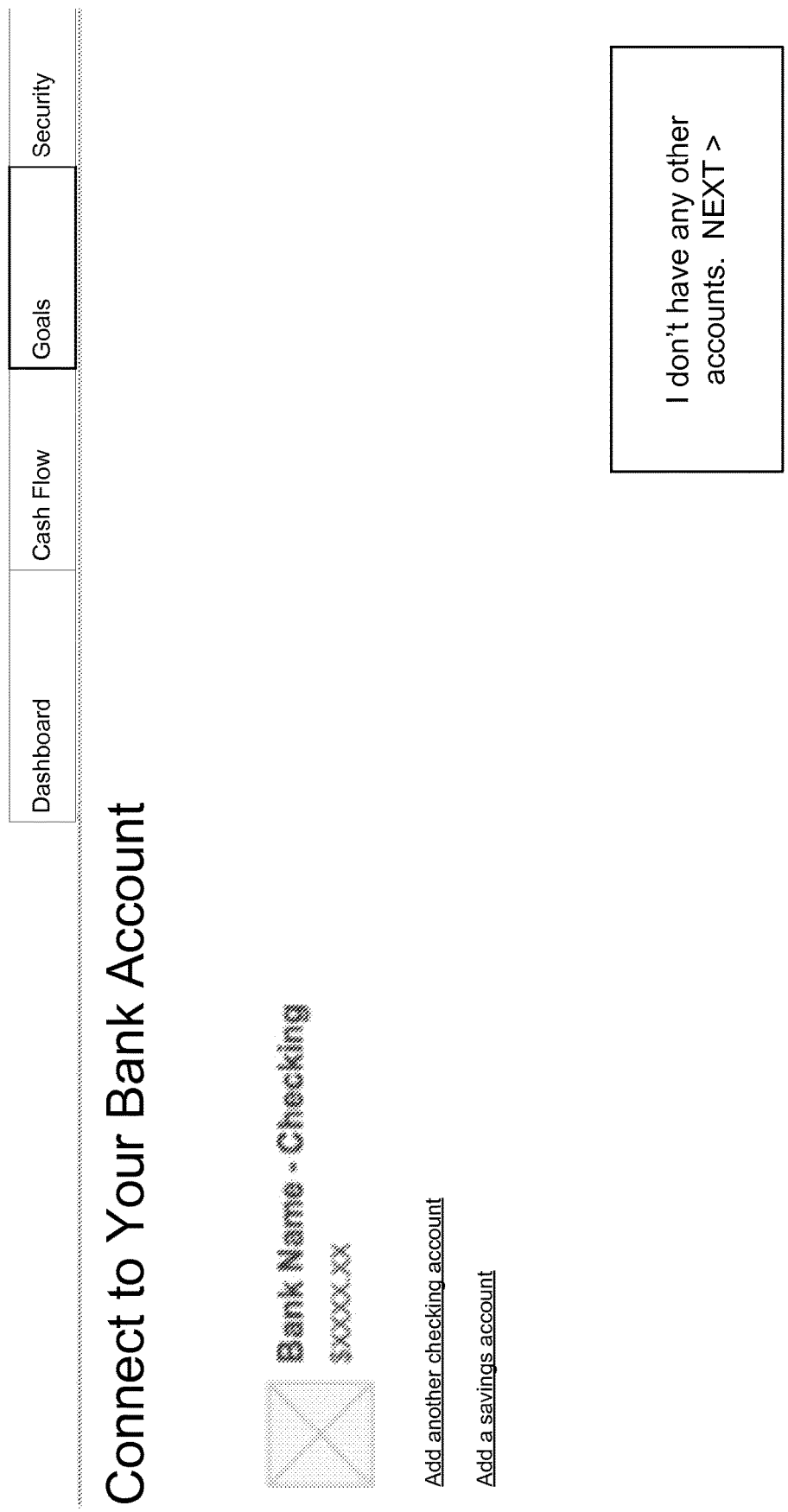
Figure 12:
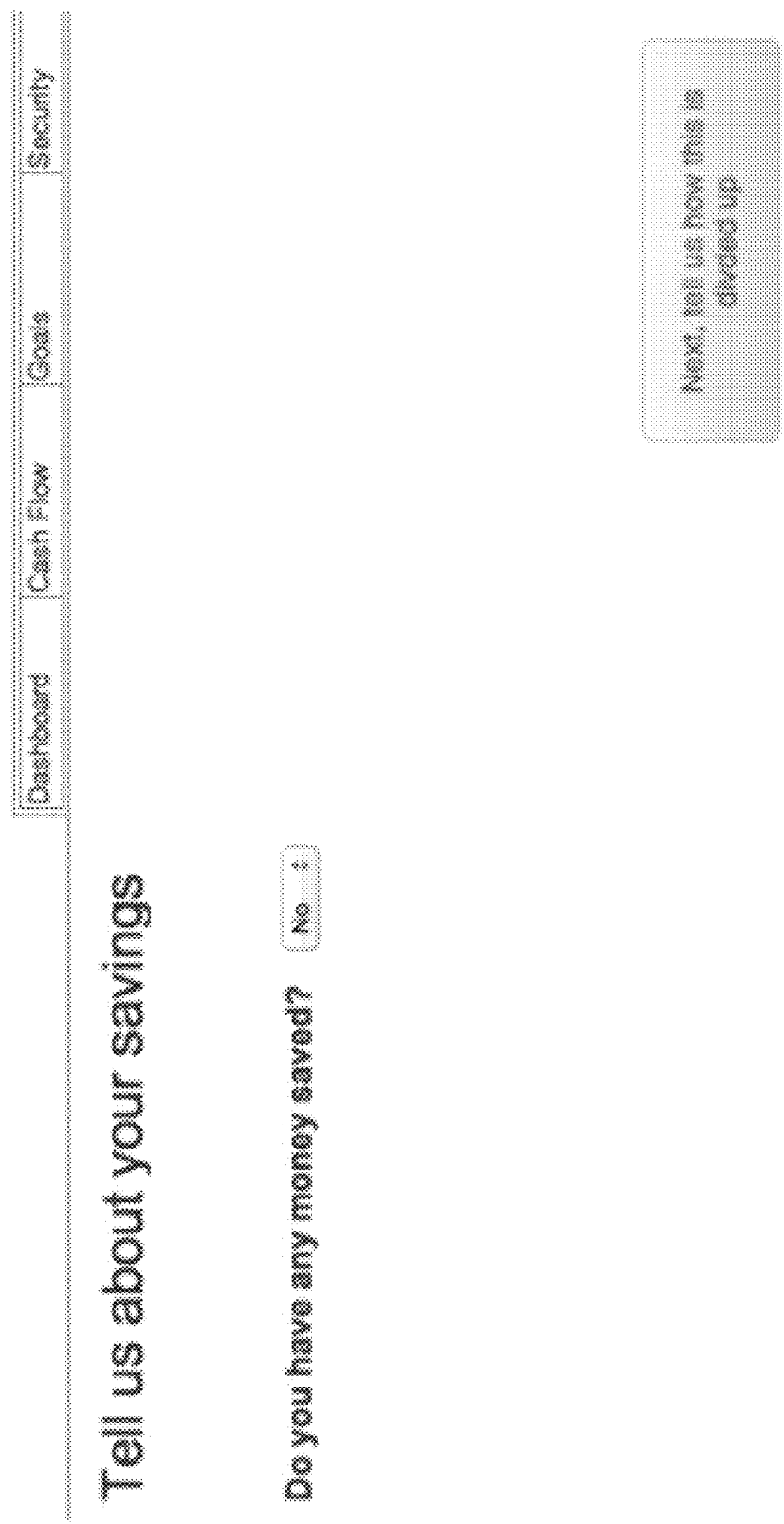
Figure 13:
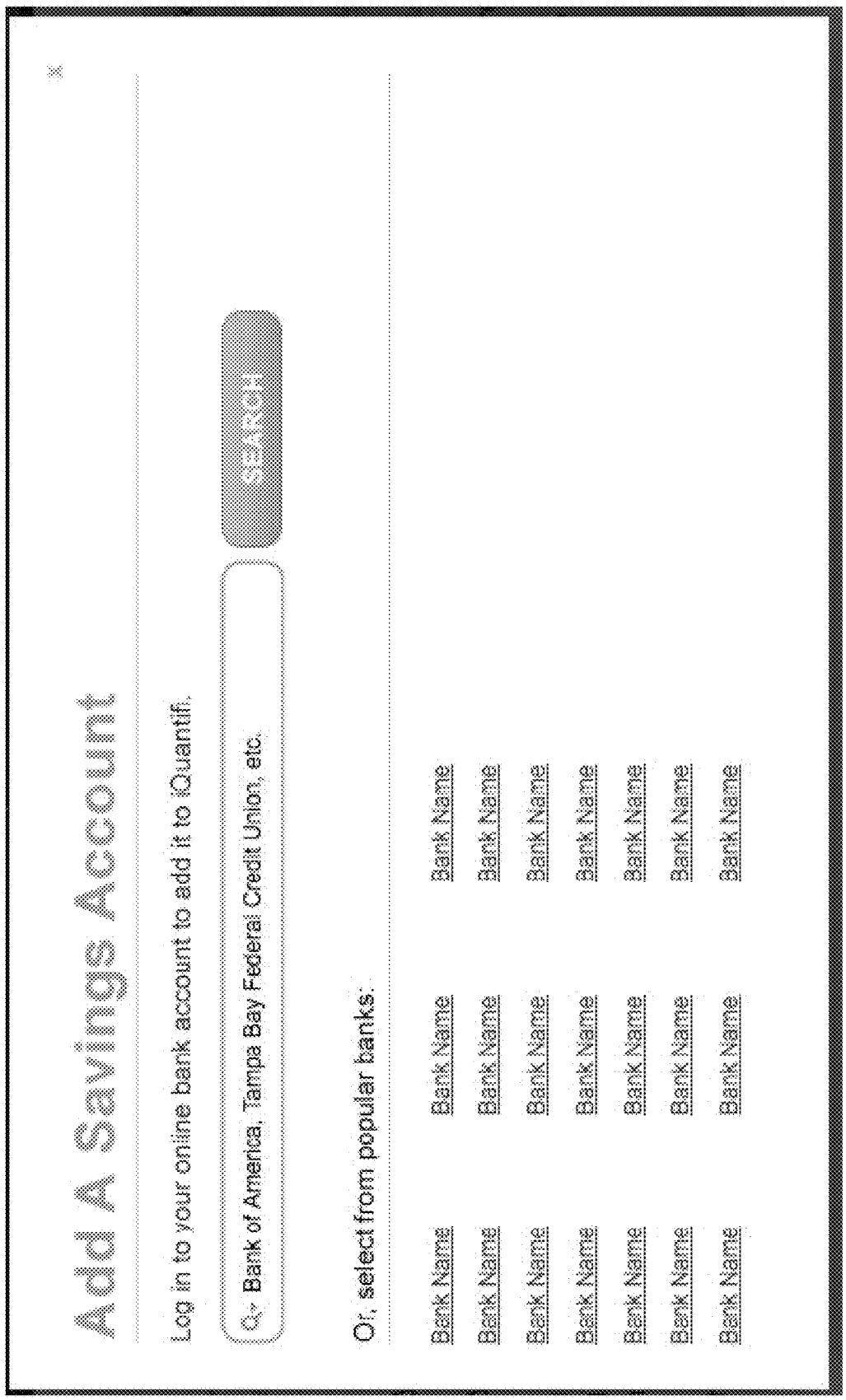

In one embodiment, as seen in FIG. 1, a user initially creates an account within the system 10. The account has a username and password that the user thereafter uses to log into the account through the system. Upon logging in 12, the user selects a desired demographic category 14, then selects desired goals 16. The system can have different types of goals with different time frames in which to achieve the goal. Some time frames can be determined or set by the user. Examples of goals are discussed in more detail below, and may include, but are not limited to, premature death planning, disability planning, establishing cash reserves (1 month, 3 months, 6 months), buying or leasing a car, buying or leasing a house or other real estate, elimination of debt, saving or paying for college or other education, saving for retirement, and planning for long-term care.

The system then prompts the user to provide financial information (such as, but not limited to, income, expenses, checking account data, and credit card account data) 18. The system then calculates the user's cash flow 20. In one exemplary embodiment, the user enters his or her income, and provides the checking account and credit card account data, from which the system determines expenses and the resulting cash flow, as described below.

The user then modifies or completes the input for the desired goals 22. The system, using a processor or microprocessor, automatically calculates and determines the financial requirements to achieve each of the goals 24, structures financial products or plans for each goal 26, and determines whether the user has sufficient assets and/or cash flow to fund or achieve the goals 28. If there are sufficient assets and/or cash flow, the system prioritizes the goals 30 according to a set of business rules (described below), and if it determines that the user has sufficient assets or cash flow to fund prioritized goals 32, then it creates a list of user "action items," ordered according to goal priorities 34. The user can accept the list 36, or modify or customize the list 38. Once accepted, the system creates and/or displays a offerings list for the first goal 40, and prompts the user to select an institution or product to implement the goal 42. Upon selection, the user is routed to the portal page for the institution or product 44, or in an alternative embodiment, the system handles the interaction with the institution or acquires the product. The user is then prompted to repeat the offering process for the other goals on the action item list.

If the user does not have sufficient assets and/or cash flow to fund or achieve the goals, the system prompts the user to find other sources of income (e.g., tax refunds) 50, modify the cash flow 52, or modify the desired goals, until the goals are within the range of assets and cash flow.

In one exemplary embodiment, the business rules for the system encompass capital allocation business rules, cash flow allocation business rules and parameter "stretch" business rules. These rules are described in more detail in the appendices attached hereto and incorporated herein by reference.

In an exemplary embodiment, as part of the cash flow calculation 20, the system categorizes each expense item derived from the aggregation of the user's checking account and credit cards, and any other account used for their monthly expenses into the following expense categories:

a. Committed Expenses—expenses incurred by the user that have to be paid and/or are fixed in amount per month, such as a mortgage payment.

b. Discretionary Expenses—expenses that the user has discretionary decision making capabilities each month as to whether or not to have the expense or the amount/degree of that expense, such as dining and entertainment.

c. Savings—monthly debits from the user's operating accounts or income sources that are distributed to the user's other accounts for purposes of cash accumulation.

d. Taxes—debits from the user's income sources or operating accounts distributed to pay federal and state taxes.

In one exemplary embodiment, if the user does not have sufficient available monthly cash flow to meet all their financial goals, the system will recommend reallocation of monies 52 to increase the available monthly cash flow in the following order:

a. Federal income tax payments/withholding will be reduced if the user receives a federal tax refund.

b. Non-monthly Recurring Discretionary expenses will be reduced, such as travel, subscriptions, dues, fees, and the like.

c. Monthly Recurring Discretionary expenses will be reduced, such as dining and entertainment, cable TV, and the like.

For product structuring 26, the system identifies the specific financial product that the user needs to implement to achieve their financial goal. For example, if a user has a goal of buying a house, the system determines not only the mortgage amount but also the most suitable term for the mortgage, such as a 15-year or 30-year mortgage based on the user's specific financial situation taking into consideration all of their goals. In the case of life insurance for "protection" goals, the system determines not only the amount of life insurance, but also the type of insurance (term or permanent), and the duration of the policy (if term), such as a 10-year or 30-year term that is most suitable for that particular user.

Goal timelines are a significant factor. Users can adjust the timing of a financial goal by "sliding" it along a comprehensive timeline. The system recalculates all the financial goals of the user in real time after the user slides one financial goal along the timeline to illustrate for the user how it affects all their other goals. For example, if the user initially indicated that they wanted to buy a car in 18 months and a house in 3 years, this function enables the user to move the timeframe of the house to 12 months and see how it affects the car goal and all other goals that this move may affect in order for the user to make real time decisions regarding their whole financial situation.

Figure 5:
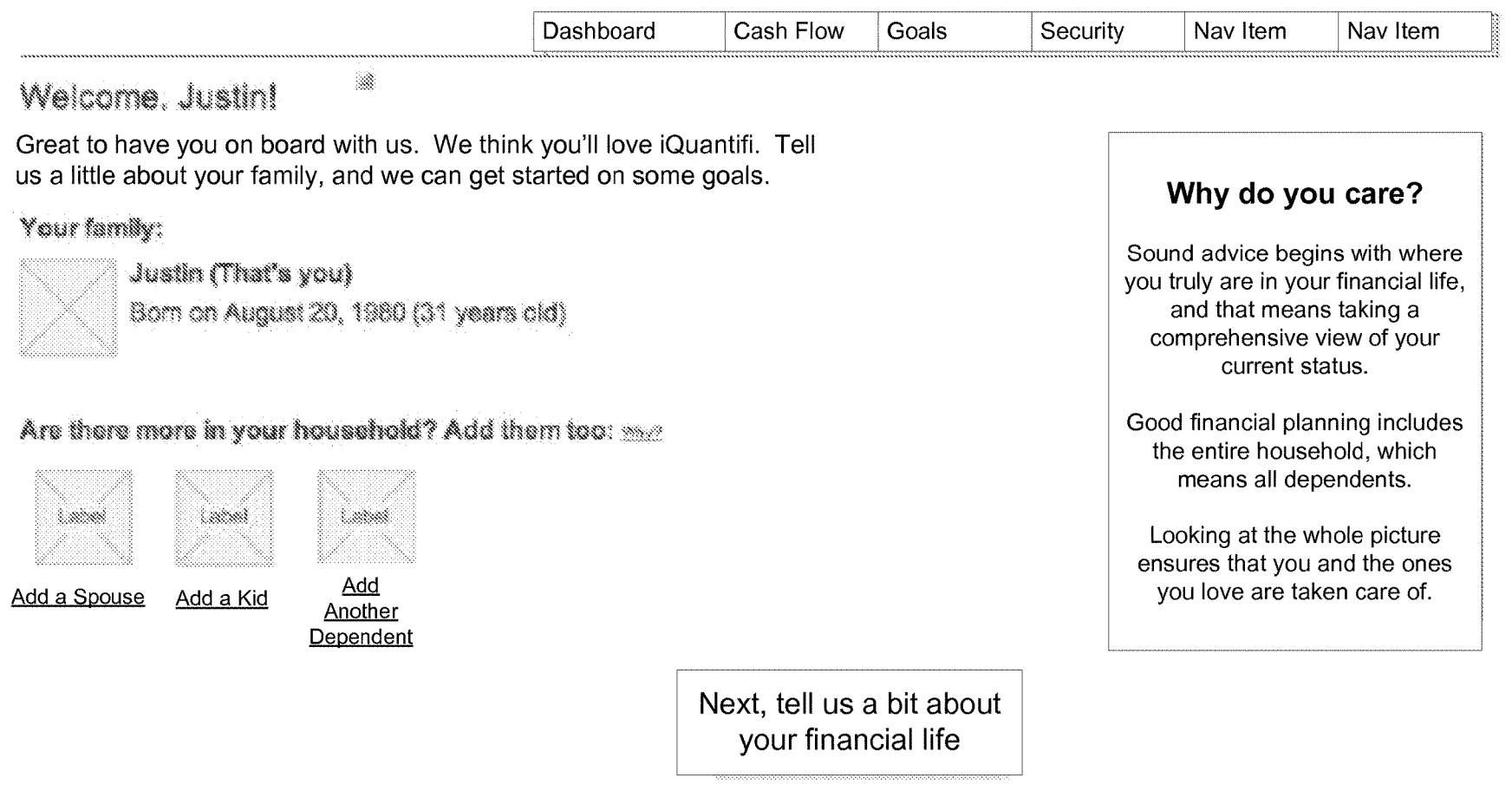
Figure 6:
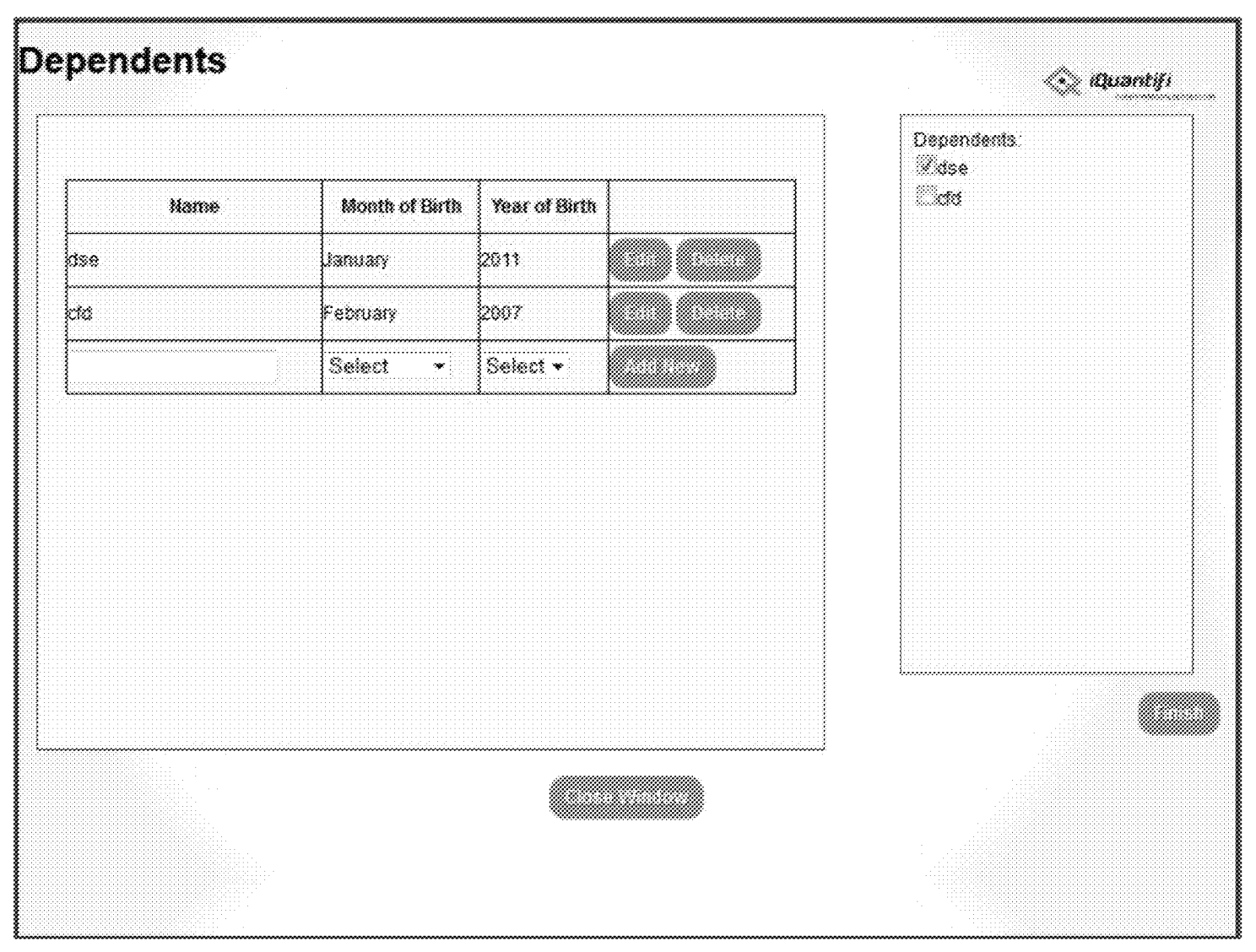

In one embodiment, as shown in FIGS. 5-8, a potential user is prompted to enter the system through a three-step path. The potential user is first prompted to provide information about himself or herself, spouse, children, or other dependents, as seen in FIGS. 5 and 6. Some basic additional information is solicited, as seen in FIG. 7. The system then determines and presents a list of suggested goals to work on 50, as seen in FIG. 8. The user may add to the list of recommended goals using the sidebar optional goal selections 52. Some additional information about each goal can be provided by hovering the mouse or arrow icon over the goal.

In this embodiment, at this point the user must sign up or log into the system to continue. After signing up and securely logging in, the user is presented with a list of initial steps to complete to continue 60, as seen in FIG. 9. These are based in part on the list of recommended goals and added goals from above. Each step takes the user directly into a corresponding goal-setup wizard that walks the user through the process of collecting data related to that selection. After completion of the wizard (which may be indicated on this page by a check-mark 62, as shown), the user is returned to this page to complete the remaining steps. After completing each wizard (which are described in more detail below), the user clicks the "Quantifi" (or similar) button 64, which takes the user to the "Goals" or "Dashboard" pages, as appropriate.

Figure 14:
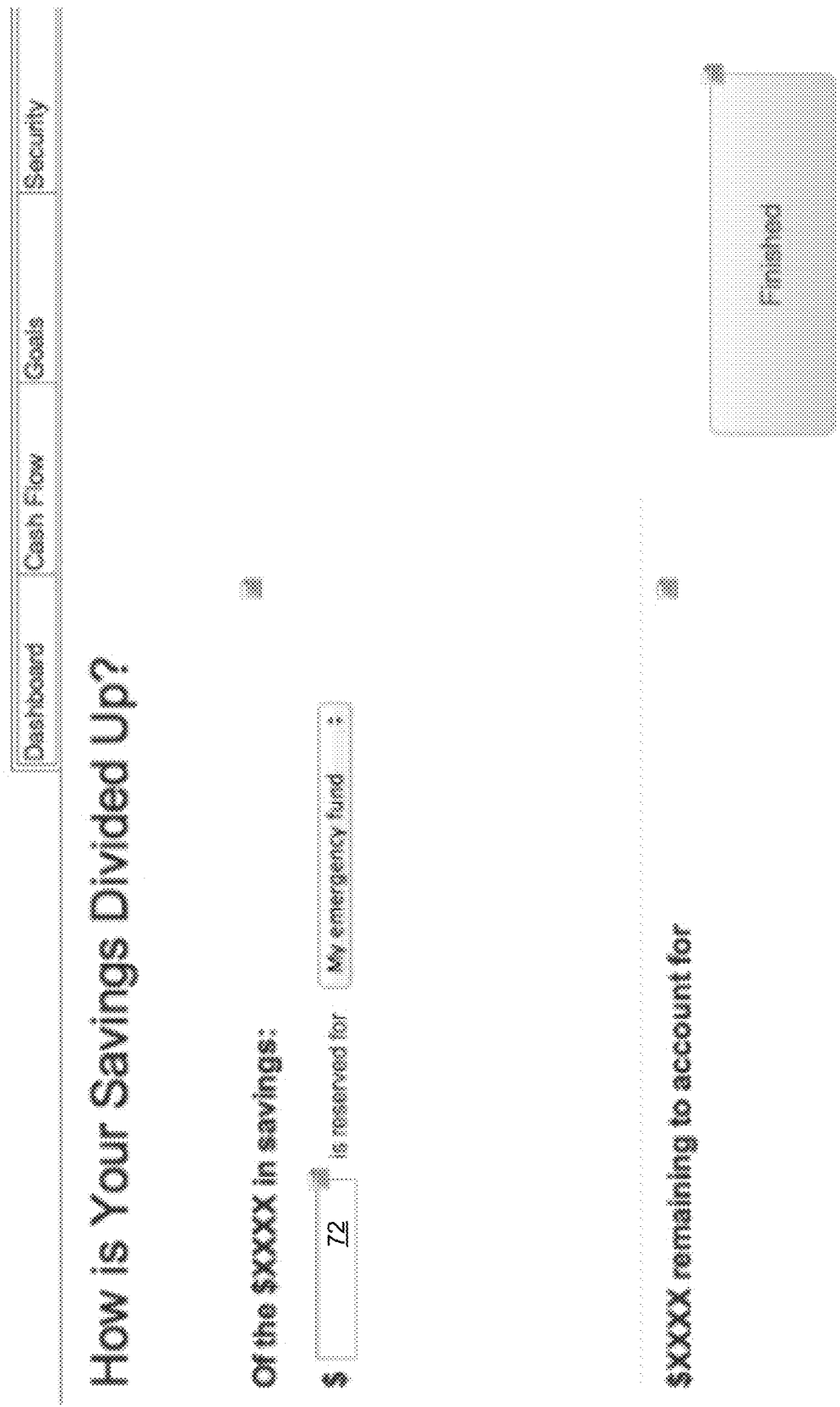
Figure 19:
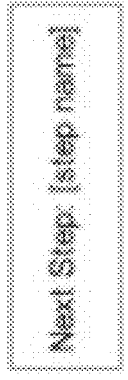
Figure 22:
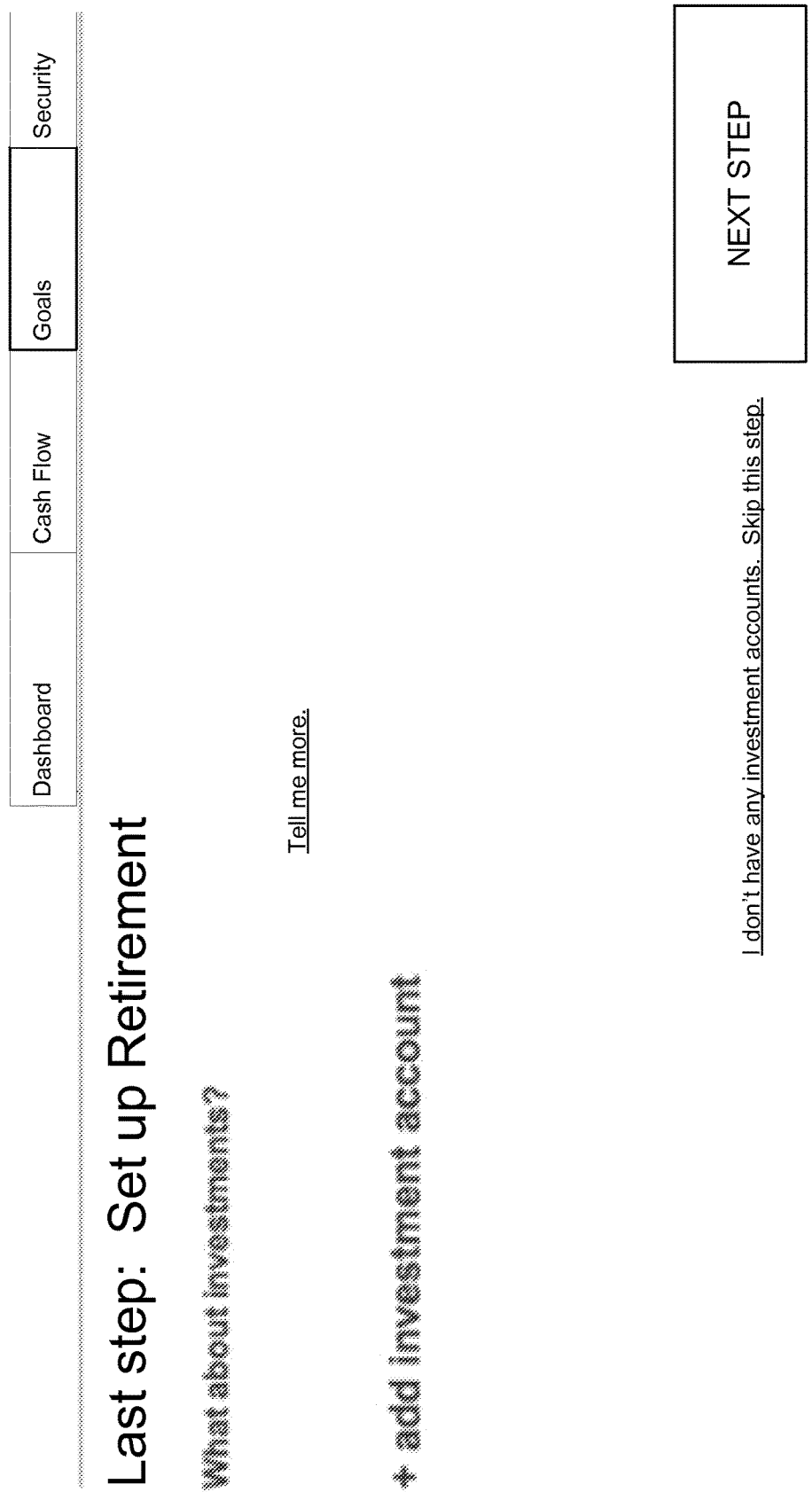
Figure 23:
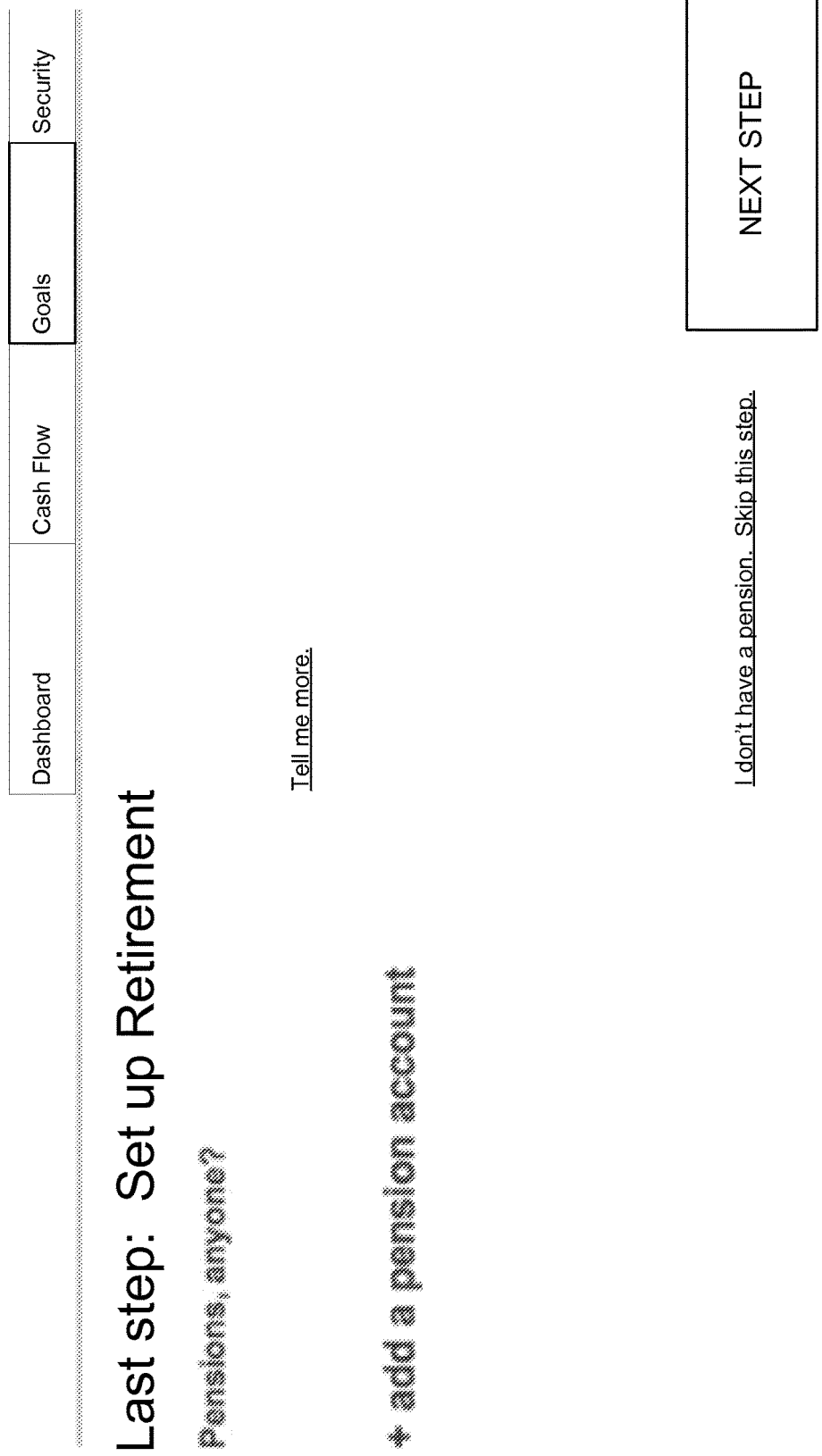
Figure 24:
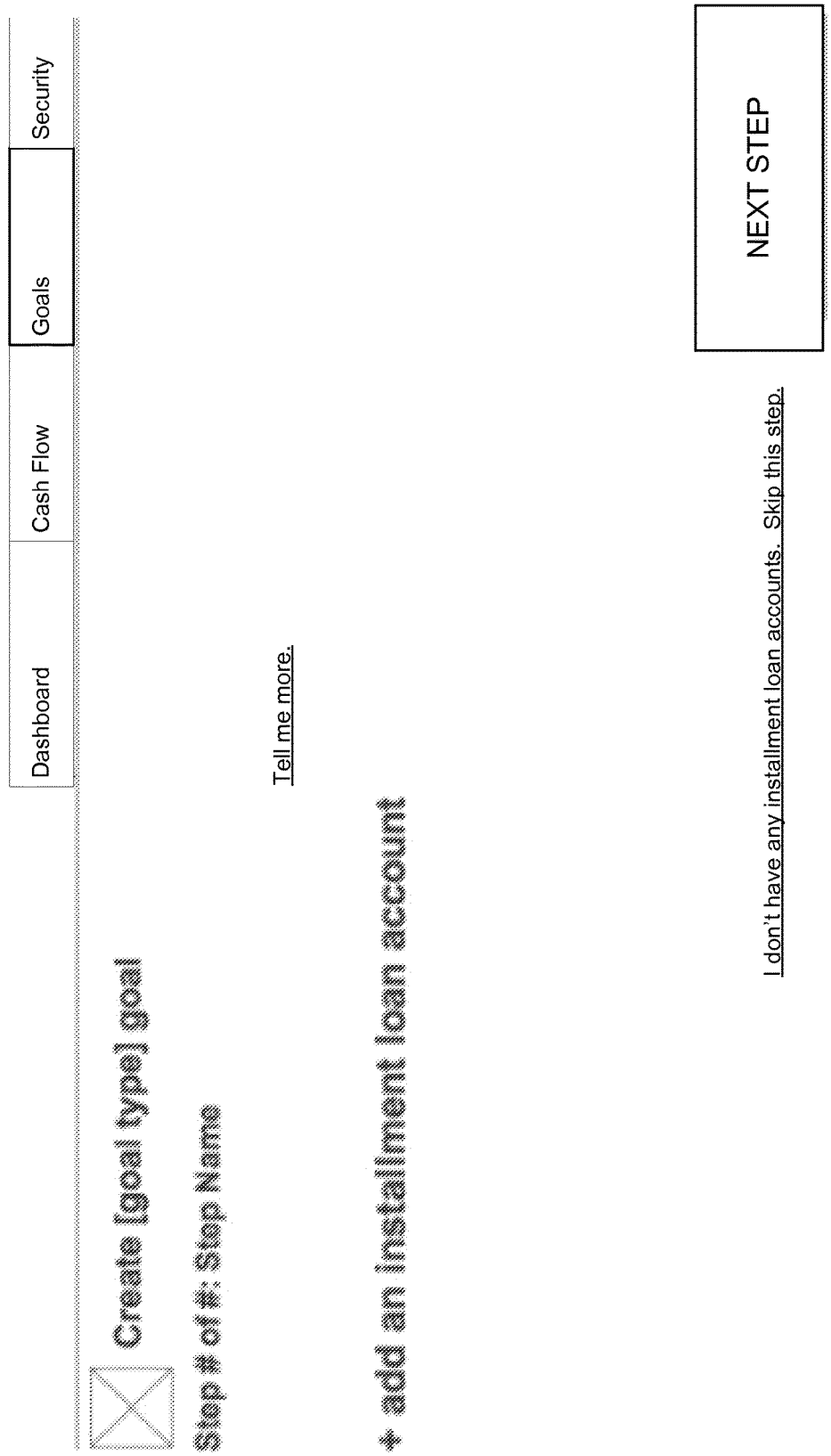
Figure 25:
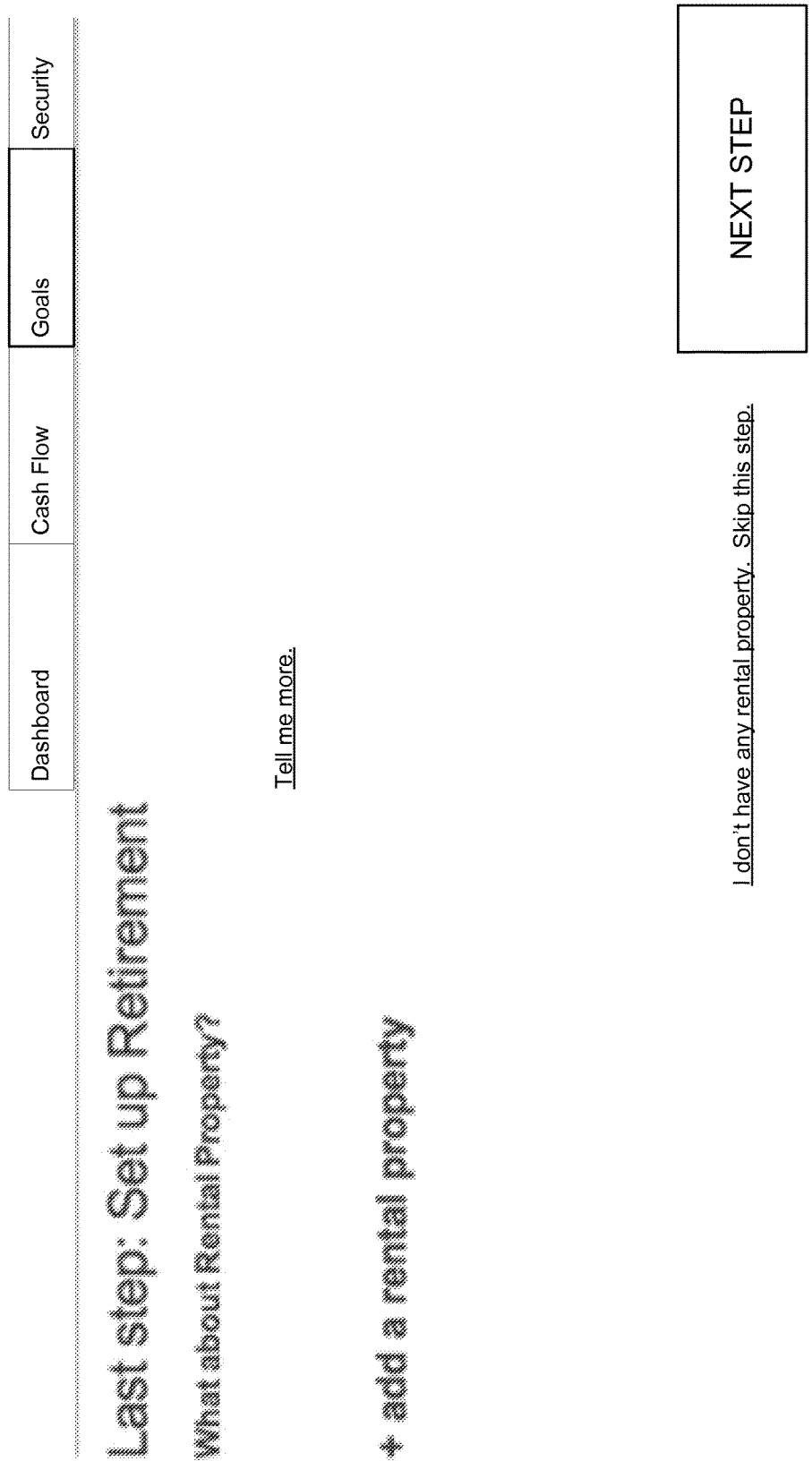
Figure 30:
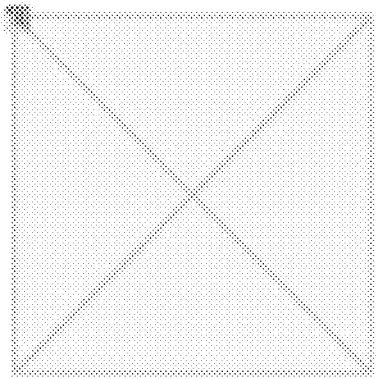
Figure 31:
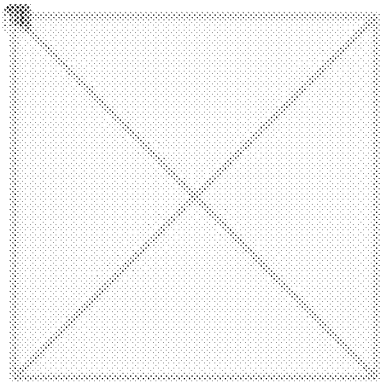
Figure 34:
Figure 35:
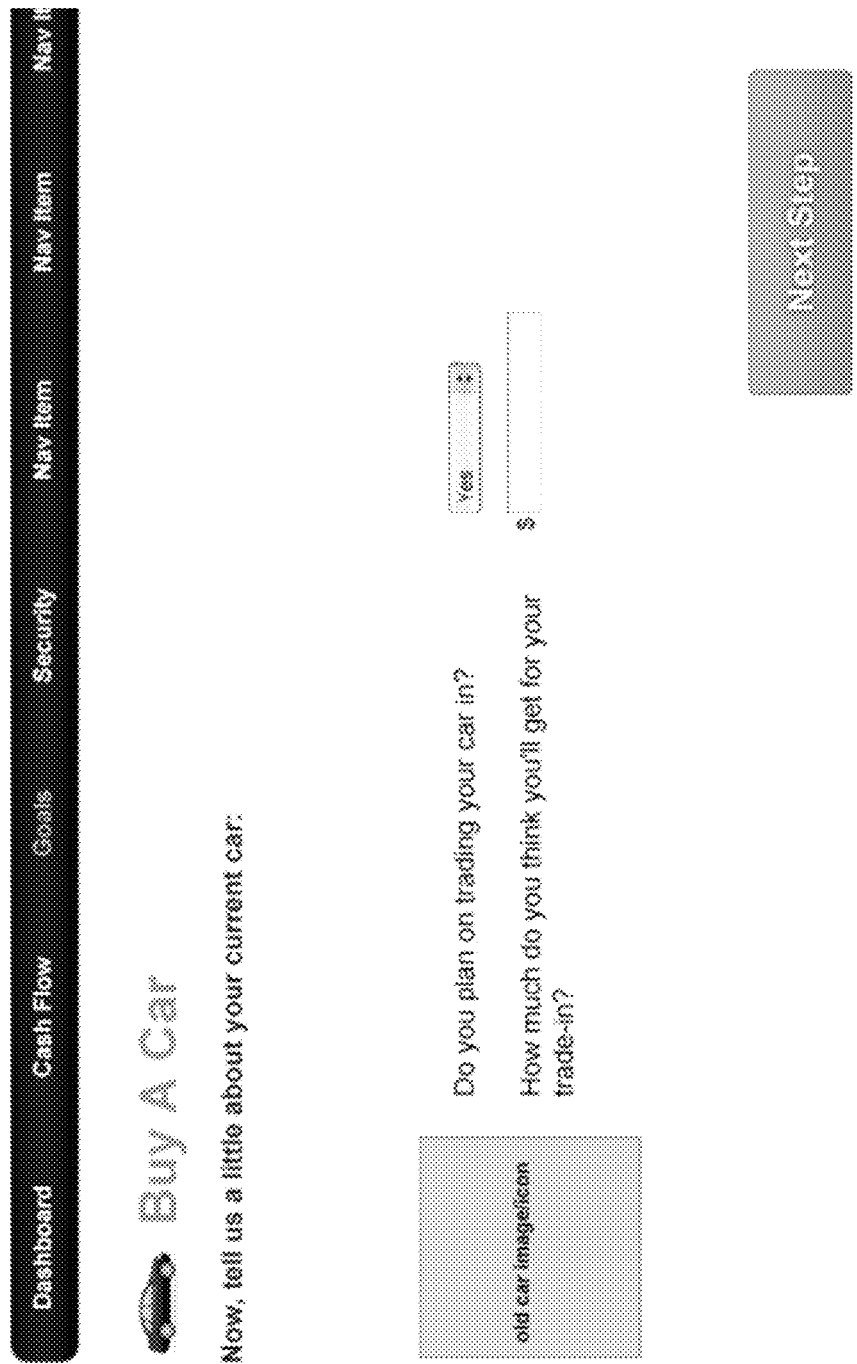

The "Connect to Your Bank Accounts" selection, for example, prompts the user to identify and select his or her checking and savings accounts to be added to the system, as seen in FIG. 10-13. For each savings account identified, the user is prompted to identify the amount 72 that is being partitioned off as the user's "emergency fund," as seen in FIG. 14. An emergency fund is a reserve of cash that protects the individual against unforeseen events that might incur a substantial cost. Information from these accounts (such as balances) may be directly accessed by or provided to the system periodically with user authorization, but without constant or continual user input or action.

FIG. 15 shows an example of a screen soliciting information about the user's (and family's) insurance policies. The information includes the type of policy 82, amount of the policy 84, and the monthly cost 86. The user also can identify the absence of a policy 88.

FIG. 16 shows an example of a screen soliciting information about school plans for the user's children or dependents (or the user or spouse). This information will be used to prepare the education savings plan.

FIGS. 17-26 show an example of the process of collecting information regarding retirement. The user is prompted to identify the age at which they (and their spouse) wish to retire, and the current status of any investment retirement accounts, pensions, rental property, social security benefits, and installment agreements.

FIG. 27 shows an example of a screen soliciting information about the user's debts, including credit cards, automobiles, mortgages, and other forms of debt. This information includes the type of loan, debt-holder, balance owed, and monthly payments.

A summary page of debts is shown in FIG. 28.

FIGS. 29-33 show an example of the process of collecting information regarding buying a new home. The user is prompted to provide information about the home they would like to buy, how they plan to pay for the new home, and the home they currently live in (if any).

Similarly, FIGS. 34-37 show an example of the process of collecting information regarding buying a car. The user is prompted to provide information about the car they would like to buy, how they plan to pay for the car, and the car they currently own (if any).

Figure 38:
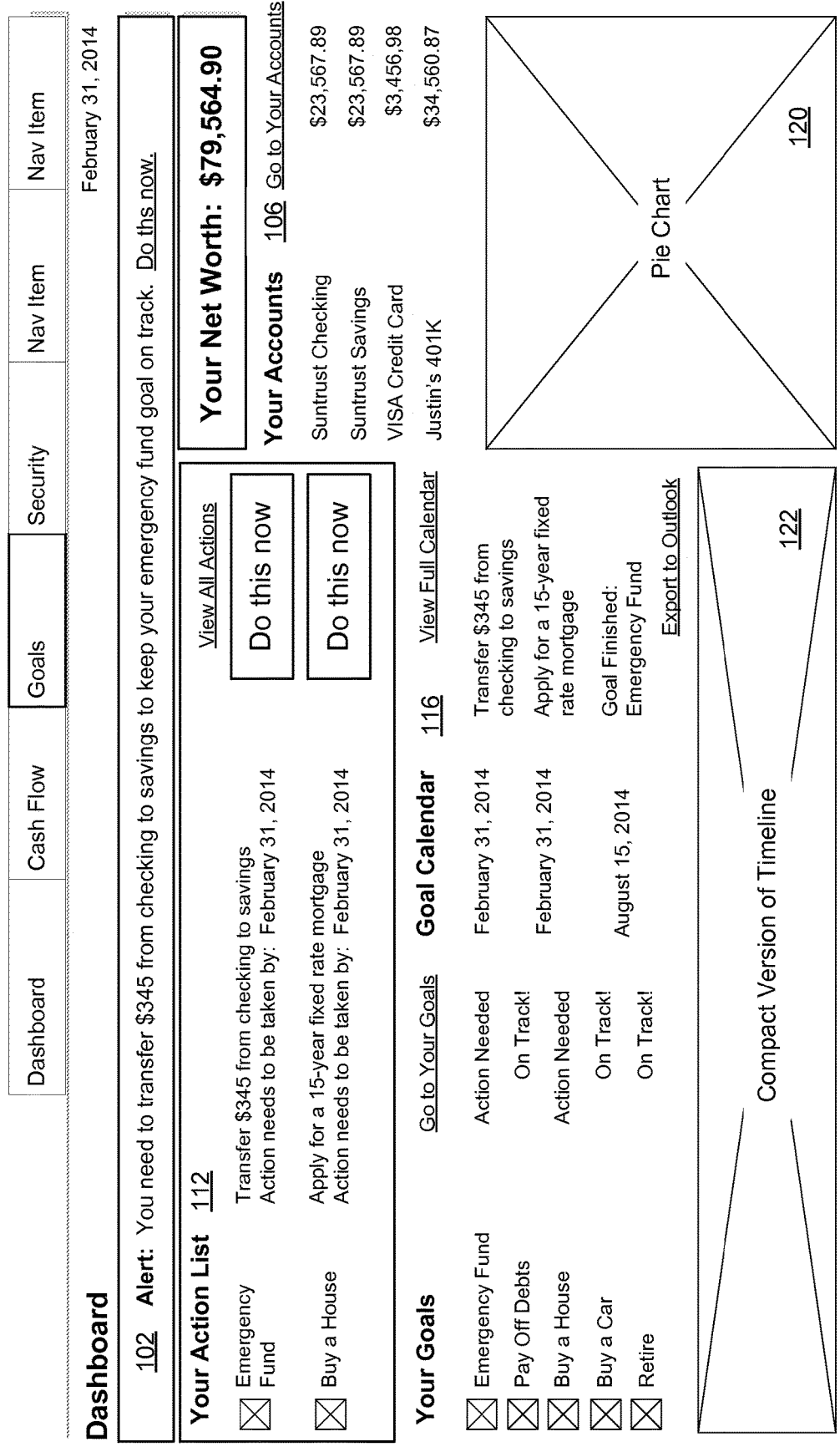
FIGS. 38 and 39 show examples of a home page or dashboard.
Figure 39:
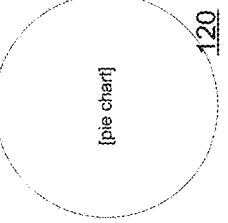

FIGS. 38 and 39 shows examples of a "Dashboard" screen or home page that provides a variety of information and alerts of interest to that user. It provides alerts to the user for certain conditions (such as a low account balance) and prompts them to take action 102. It may provide a summary of financial goals 104, an overview of financial accounts 106, a cashflow summary 108, access to an expense planner 110, a top action item list 112, a message center 114, a calendar of financial actions 116, and a "Quan" points summary 118 (described in more detail below). It also may display a net worth or cash flow pie chart 120 and a form of goal timeline 122. The user also may access several functions by the tabs along the top of the dashboard (e.g., Action List, Goals, My Networth, My Cashflow, Expense Planner, Glossary, and Community).

Figure 41:
FIG. 41 shows an example of a Take Action screen.

FIG. 40 shows an example of an Action List 130. This presents several proposed actions, which can be marked as accepted, not accepted, or completed. If accepted, a "Take Action" or "Do This Now" icon 132 is displayed that the user can select to begin taking action on the recommendation (as seen in FIG. 41). The Action List is developed as a result of the cash flow analysis and goal-setting process, as described herein, and the list of action items may be broken-down into goal categories (e.g., foundation goals, purchase goals, accumulation goals, and the like).

Figure 42:
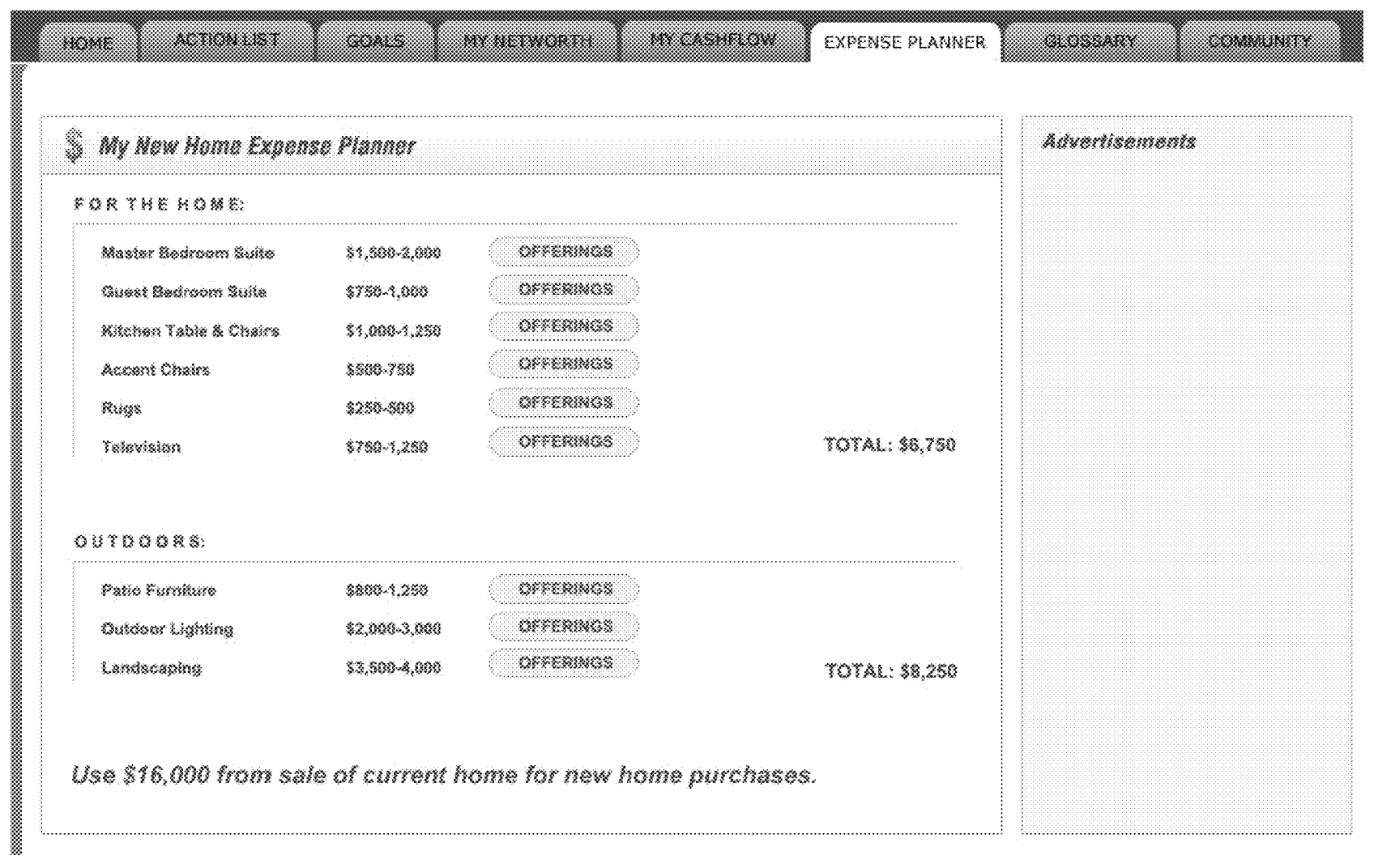
Figure 43:
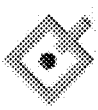
FIG. 43 shows an example of an online offering screen.

FIG. 42 shows an example of an expense planning screen. This allows the user to plan for specific expenses, and to even take action to shop online, as seen in FIG. 43.

Figure 44:
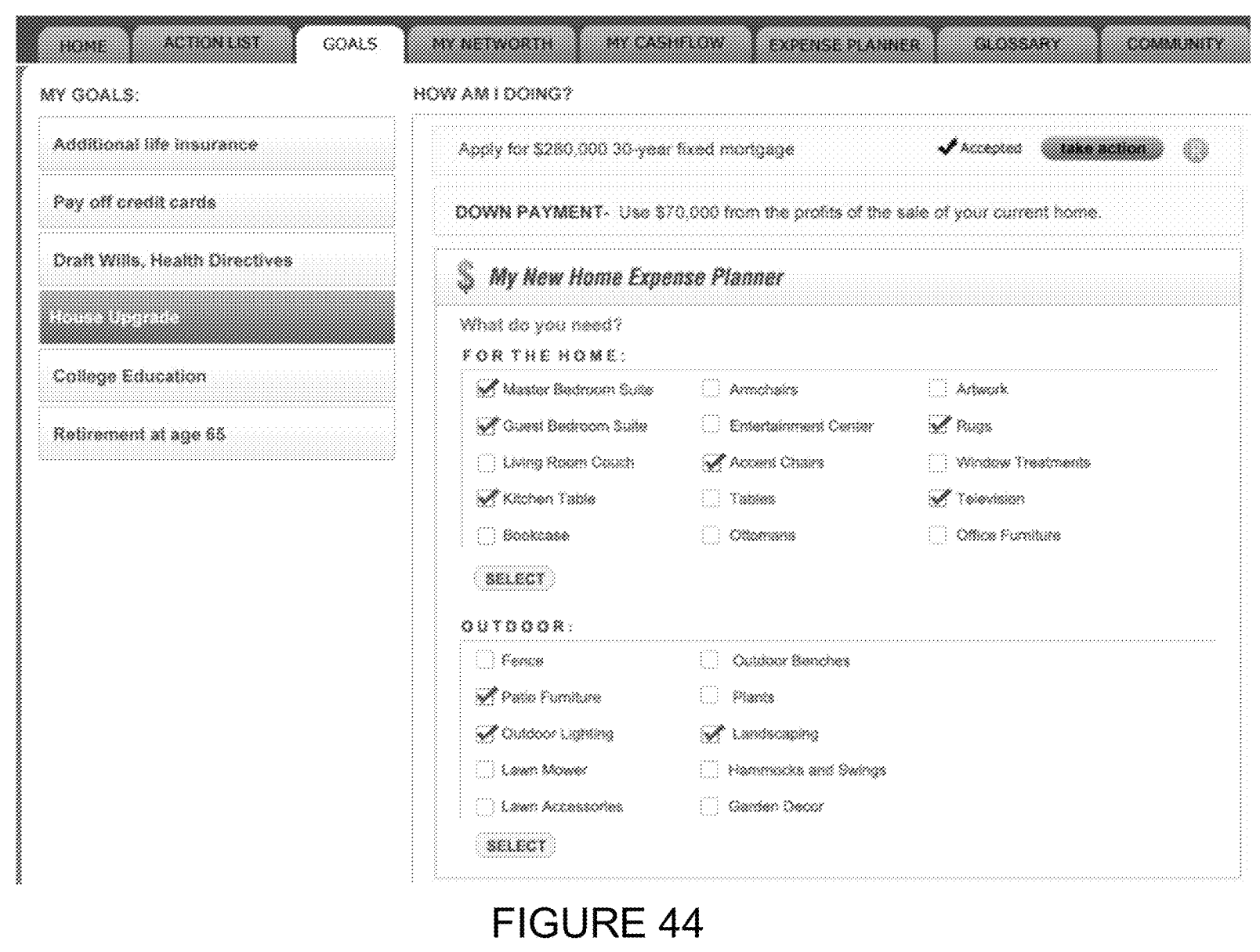

FIG. 44 shows an example of a goals screen. This allows the user to access information about, plan for, and make decisions about particular goals. These changes are reflected in other parts of the system (e.g., the expenses associated with the purchase of a new home are shown in the expense planning screen, described above).

Figure 46:
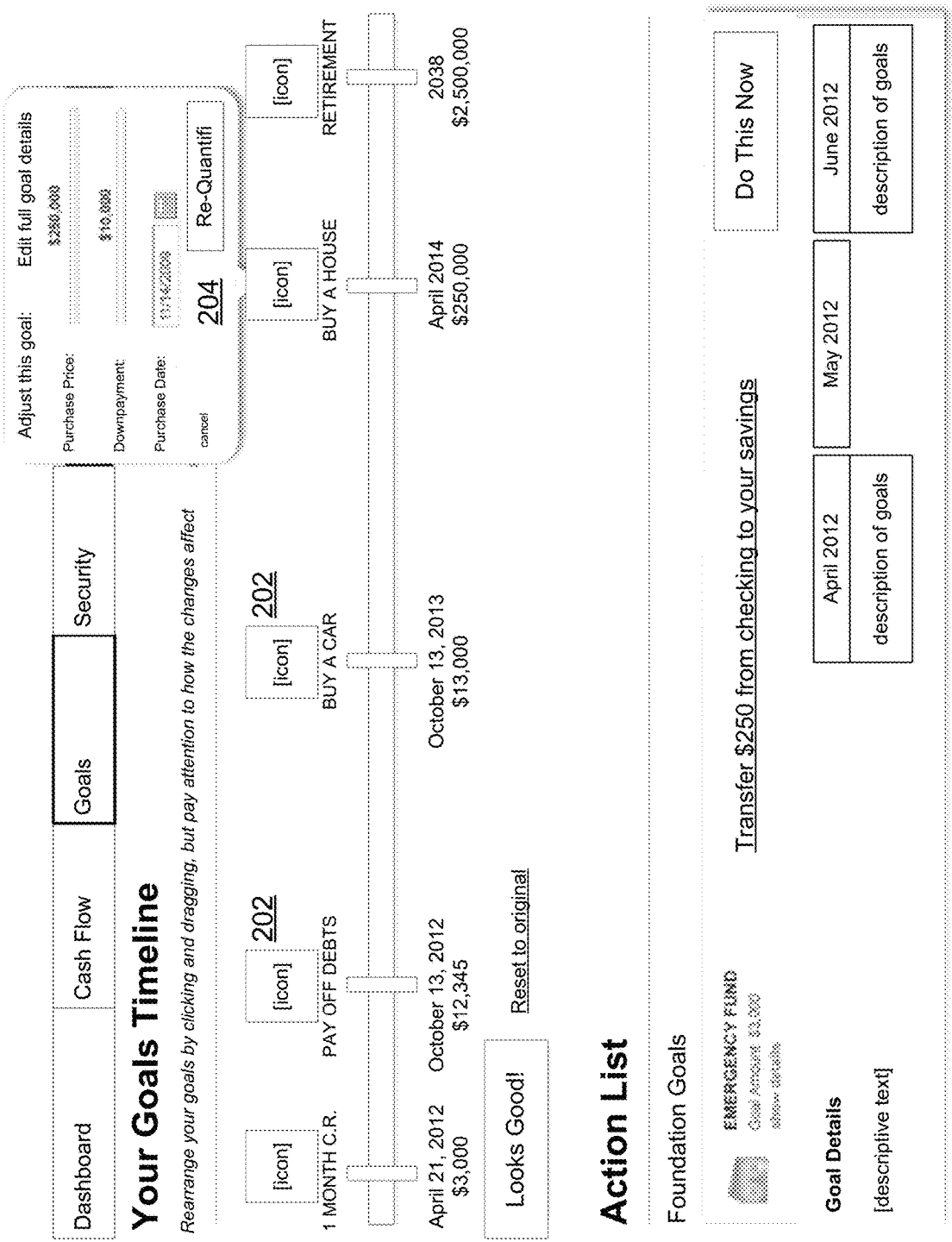
FIGS. 46 and 47 show examples of goals timelines.
Figure 47:
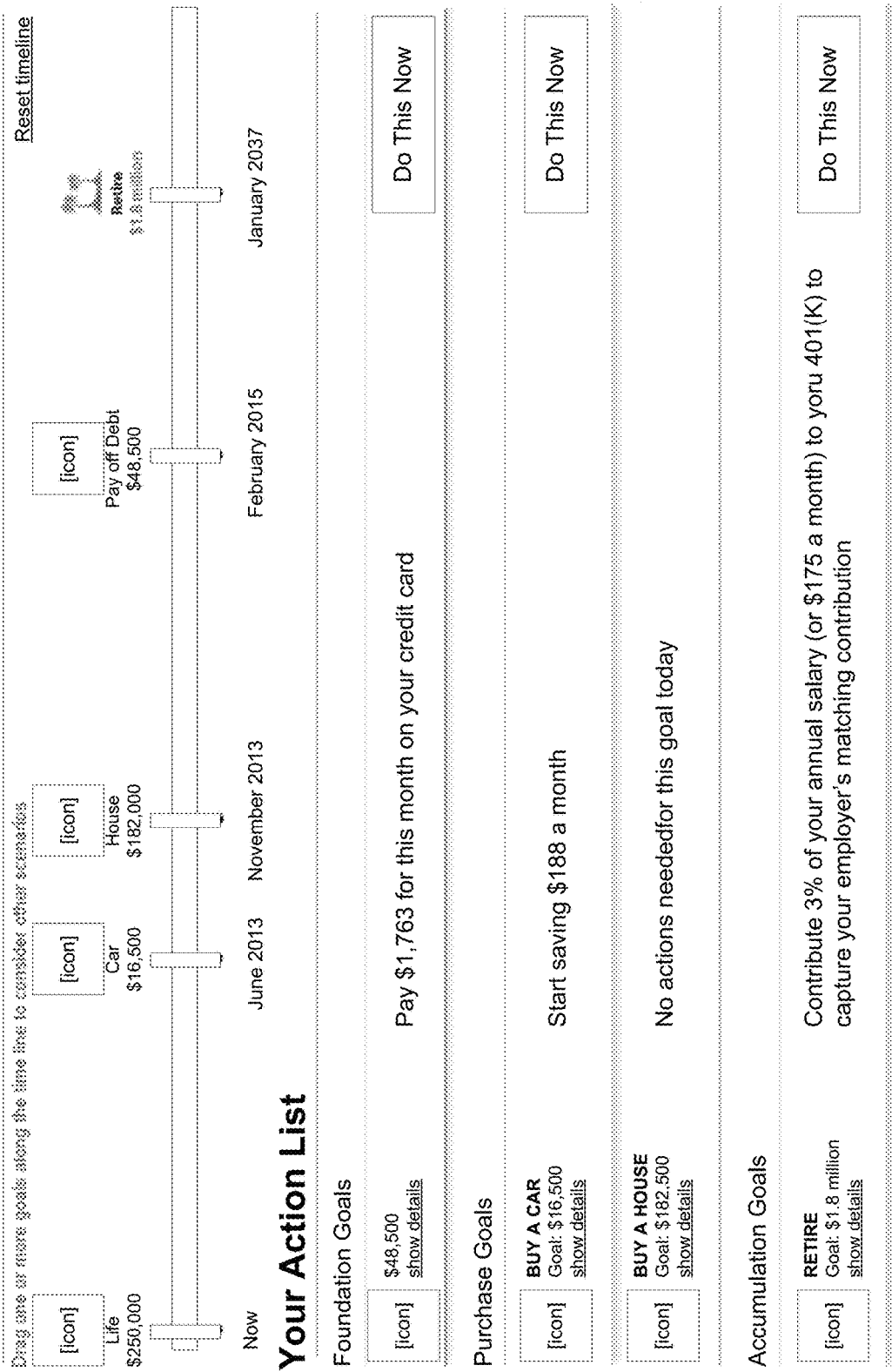

In one embodiment, the user can easily organize goals, once selected, into short-term, medium-term, and long-term goals graphically, as seen in FIG. 45. In this embodiment, goal icons or listings can be dragged and dropped into desired categories. Goals can also be presented on a timeline, as seen in FIGS. 46 and 47. The user can rearrange the timing of goals by clicking and dragging the corresponding icons 202, or directly modify a goal by clicking on it to open an editing window 204.

In yet another embodiment, the system comprises an investment advisory component. The system recommends specific mutual funds and stocks for the user to implement to save for specific financial goals, such as college, retirement, etc., based on the user's investment objective, investment timeframe, and investment experience. For example, if a user has a goal of buying a car in 3 years and needs to save each month for the purchase, the system determines the specific type of mutual fund or cash instrument to save in each month, and recommends the specific mutual funds within that type of fund. In this scenario, the system determines that either a short term bond fund or intermediate bond fund would be an appropriate type of fund based on the user's investment profile, and recommends specific mutual funds based on the custodian or investment firm that the user's account resides in or will open up an account with.

The system further comprises a client service model. The system identifies changes in the user's financial situation as well as in the economy and markets to make recommendations to take advantage of opportunities to improve the user's financial situation and their progress toward their goals. For example, if the system identifies that the user's checking account increased by $20,000 as a result of receiving an income bonus, the system will generate recommendations on how that $20,000 should be allocated relative to the user's outstanding goals without the user prompting the system to factor in the $20,000 in new assets. In another scenario, if there is a change in mortgage rates, the system identifies which users have mortgage rates above a certain percentage point in order to recommend refinancing to those specific users. In an investment related recommendation during a down market, the system identifies which non-qualified positions in users' accounts are below their cost basis, and recommends selling those positions to capture a tax loss, and potentially recommends buying back those same positions after 30 days if the investment thesis for having owned it still holds. If not, the system recommends an alternative position to buy.

The expense planner function enables the user to select a specific consumer item to purchase, and specify every characteristic of that item. For example, because certain financial goals have consumer purchases related to it, a user buying a house may need to also buy a stove. In this scenario, the user selects a stove and selects the specific characteristics of the stove they want to purchase: electric or gas; three-burner or four-burner; black or white; single-oven or double-oven. After the user identifies the specific stove they want to purchase, the system searches for that particular item among retail institutions that carry that specific item.

In a further embodiment, the system comprises an "UpTouch" feature enabling a user to receive a referral of an independent financial advisor within their community to hire. The system's algorithm identifies the advisor who best fits with that user based on the user's selection of the type of advisor they are looking for, the practice specialty of the advisor, and the office location of the advisor relative to the user's home or work location.

The system also can automatically calculate a Financial iQ (FiQ) score based on the user's financial goals, demographics, assets, liabilities, policies, income and expenses, which estimates the user's ability to sustain long term financial commitments, such as a mortgage payment. In one embodiment, the FiQ score may be weighted based on peer comparisons and determinations of where the user should be. FiQ Score components include the following:

Goals—is the user addressing or working towards the stated goals?

Type of Assets—does the combination of assets possessed by the user indicate high risk? (E.g., a second house but no cash reserve).

Type of Liabilities—does the combination of liabilities possessed by the user indicate high risk?

Net Worth—amount of total assets less total liabilities

Relative Net Worth—(total household income)×(age of oldest person)/10

Cash Flow—are the cash flow components within appropriate percentage ranges?

Surplus/Shortage Cash Flow—the percentage of cash flow that is surplus (or shortage)

Contingency Plans—are wills, insurance policies, powers of attorney, and other contingency plans in place?

Income Relative to Potential—how does the user's actual income compare to earnings potential based on education and experience?

Size of Household—relative to income and net worth

Status of Goals—relative to the pace of accomplishment or completion

Tax Withholding—is the user receiving a tax refund?

The system's economic indices reflect the financial decisions users make throughout the system as a result of the purchases of financial products and services made by system users.

These embodiments, as well as other exemplary embodiments, as well as the tools and programs referenced above, are described in detail in the attached appendices which are attached hereto and incorporated herein in their entirety (including all text and figures therein) by reference:

Appendix A—"Business Rules Goal Optimization and Prioritization" (42 pages)

Appendix B—"Capital Allocation Business Rules" (2 pages)

Appendix C—"Cash Flow Allocation Business Rules" (2 pages)

Appendix D—"Parameter Stretch Business Rules" (2 pages)

Appendix E—"Product Structuring Business Rules" (5 pages)

Appendix F—"Recommended Cash Flow Business Rules" (15 pages)

Appendix G—"Investment Advisory Business Rules" (2 pages)

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infra-red, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A machine for prioritizing and achieving goals, comprising:
 a processor or microprocessor coupled to a computer memory, wherein the processor or microprocessor is programmed to:
 receive financial information about a user;
 receive goal input data about the user for a plurality of goals, wherein goal input data includes a time frame for achievement of at least one of said plurality of goals, said plurality of goals including two or more of the following goal types: one-month cash reserve, retirement goals, debt elimination goals, education funding goals, future vehicle purchase goals, and future house purchase or loan refinance goals;
 calculate initial available assets for the user based on the financial information;
 calculate the asset need for each of the plurality of goals;
 determine the priority level of each of the plurality of goals;
 obtain a set of capital allocation rules that define asset allocation order as a function of goal type and goal priority level;
 automatically determine the asset allocation order for the user by evaluating the goal types and goal priority levels of said plurality of goals against said set of capital allocation rules;

automatically allocate the initial available assets to said plurality of goals in the asset allocation order for the user;

recalculate the asset need for any goals that have a remaining asset need balance to determine cash flow need for each;

calculate an initial cash flow for the user based on the financial information;

obtain a set of cash flow allocation rules that define cash flow allocation order as a function of goal type and goal priority level;

automatically determine the cash flow allocation order for the user by evaluating the goal types and goal priority levels of said plurality of goals against said set of capital allocation rules;

automatically allocate the initial cash flow to said plurality of goals in the cash flow allocation order for the user;

determine whether the initial cash flow as calculated is sufficient to achieve the plurality of goals;

if the initial cash flow is not sufficient to meet the cash flow need for a goal under consideration in the cash flow allocation order, then
  obtain a set of stretch allocation rules that define stretch actions as a function of goal type; and
  automatically reduce the cash flow allocation to preceding goals for the goal under consideration in reverse order of the cash flow allocation order for the user until the goal under consideration has been allocated sufficient minimal cash flow or all preceding goals have had cash flow reduced;

if, after application of the set of stretch allocation rules, the cash flow still is not sufficient to meet the cash flow need for a goal under consideration in the cash flow allocation, then
  obtain a set of cash flow recommended modification rules that define an expense modification order for the user as a function of expense type and category; and
  automatically reduce expenses in the expense modification order to increase available cash flow;

obtain a set of product structuring business rules that structures financial products based on goal type;

apply the product structuring business rules to the plurality of goals;

automatically present a graphic display of a timeline with the plurality of goals represented by icons thereon, wherein the icons which can be dragged and dropped at different points on the timeline to represent a change in time frame for achievement of the goal associated with said icon; and automatically recalculate, in real time, upon movement of an icon on the timeline, the allocation of assets, allocation of cash flow, and application of the set of stretch business rules to all of the plurality of goals, and simultaneously update the position of all of the icons on the timeline based on that recalculation.

2. The machine of claim 1, wherein the processor or microprocessor is further programmed to:
automatically identify a recommended financial product and product structure for each goal;
assist the user in obtaining the recommended financial product for a particular goal.

3. The machine of claim 1, wherein said set of stretch allocation rules comprise the following:
any disability insurance allocation amount stays constant regardless of goal priority;
any life insurance allocation amount stays constant even if goal priority changes within three years; and
any long-term care allocation amount stays constant regardless of goal priority.

4. The machine of claim 1, wherein the processor or microprocessor is further programmed to:
automatically identify a recommended financial product and product structure for each goal;
wherein the recommended financial product and product structure for each goal is based upon the set of product structuring business rules, the goal input data for said goal, the financial requirements to achieve said goal, user cash flow, user investment experience, and user demographic information.

5. A method of prioritizing and achieving financial goals, comprising the steps of:
receiving financial information about a user;
receiving goal input data about the user for a plurality of goals, wherein goal input data includes a time frame for achievement of at least one of said plurality of goals, said plurality of goals including two or more of the following goal types: one-month cash reserve, retirement goals, debt elimination goals, education funding goals, future vehicle purchase goals, and future house purchase or loan refinance goals;
calculating initial available assets for the user based on the financial information;
calculating the asset need for each of the plurality of goals;
determining the priority level of each of the plurality of goals;
obtaining a set of capital allocation rules that define asset allocation order as a function of goal type and goal priority level;
automatically determining the asset allocation order for the user by evaluating the goal types and goal priority levels of said plurality of goals against said set of capital allocation rules;
automatically allocating the initial available assets to said plurality of goals in the asset allocation order for the user;
recalculating the asset need for any goals that have a remaining asset need balance to determine cash flow need for each;
calculating an initial cash flow for the user based on the financial information;
obtaining a set of cash flow allocation rules that define cash flow allocation order as a function of goal type and goal priority level;
automatically determining the cash flow allocation order for the user by evaluating the goal types and goal priority levels of said plurality of goals against said set of capital allocation rules;
automatically allocating the initial cash flow to said plurality of goals in the cash flow allocation order for the user;
determining whether the initial cash flow as calculated is sufficient to achieve the plurality of goals;
if the initial cash flow is not sufficient to meet the cash flow need for a goal under consideration in the order of allocation of cash flow, then
cash flow allocation order, then
  obtaining a set of stretch allocation rules that define stretch actions as a function of goal type; and
  automatically reducing the cash flow allocation to preceding goals for the goal under consideration in reverse order of the cash flow allocation order for the user until the goal under consideration has been allocated sufficient minimal cash flow or all preceding goals have had cash flow reduced;

if, after application of the set of stretch allocation rules, the cash flow still is not sufficient to meet the cash flow need for a goal under consideration in the cash flow allocation, then obtaining a set of cash flow recommended modification rules that define an expense modification order for the user as a function of expense type and category; and automatically reducing expenses in the expense modification order;

obtaining a set of product structuring business rules that structures financial products based on goal type;

applying the product structuring business rules to the plurality of goals;

automatically presenting a graphic display of a timeline with the plurality of goals represented by icons thereon, wherein the icons which can be dragged and dropped at different points on the timeline to represent a change in time frame for achievement of the goal associated with said icon; and automatically recalculating, in real time, upon movement of an icon on the timeline, the allocation of assets, allocation of cash flow, and application of the set of stretch business rules to all of the plurality of goals, and simultaneously updating the position of all of the icons on the timeline based on that recalculation.

6. The method of claim 5, further comprising the steps of:

automatically identifying a recommended financial product and product structure for each goal;

assisting the user in obtaining the recommended financial product for a particular goal.

7. The method of claim 5, wherein said set of stretch allocation rules comprise the following:

any disability insurance allocation amount stays constant regardless of goal priority;

any life insurance allocation amount stays constant even if goal priority changes within three years; and any long-term care allocation amount stays constant regardless of goal priority.

8. The method of claim 5, further comprising the step of automatically identifying a recommended financial product and product structure for each goal;

wherein the recommended financial product and product structure for each goal is based upon the set of product structuring business rules, the goal input data for said goal, the financial requirements to achieve said goal, user cash flow, user investment experience, and user demographic information.

* * * * *